(12) United States Patent
Yuan et al.

(10) Patent No.: US 10,506,606 B2
(45) Date of Patent: Dec. 10, 2019

(54) METHOD AND APPARATUS FOR ALIGNING ANTENNA BEAMS IN HIGH-LOW FREQUENCY CO-SITE NETWORK

(71) Applicant: Huawei Technologies Co., Ltd., Shenzhen (CN)

(72) Inventors: Lanjie Yuan, Shenzhen (CN); Jiebo Yuan, Chengdu (CN); Guangjian Wang, Chengdu (CN); Yi Wang, Shanghai (CN); Huang Huang, Chengdu (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/127,631

(22) Filed: Sep. 11, 2018

(65) Prior Publication Data
US 2019/0029011 A1    Jan. 24, 2019

Related U.S. Application Data

(63) Continuation of application No. 15/636,254, filed on Jun. 28, 2017, now Pat. No. 10,098,125, which is a
(Continued)

(51) Int. Cl.
*H04W 72/04* (2009.01)
*H04W 64/00* (2009.01)
(Continued)

(52) U.S. Cl.
CPC ......... *H04W 72/048* (2013.01); *G01S 5/0027* (2013.01); *H04B 7/0617* (2013.01);
(Continued)

(58) Field of Classification Search
CPC ............... H04W 16/28; H04W 64/006; H04W 72/0446; H04W 72/0453; H04W 72/046;
(Continued)

(56) References Cited

U.S. PATENT DOCUMENTS

2010/0159845 A1\*   6/2010   Kaaja ................. H04B 7/088
                                                                455/70
2014/0206406 A1    7/2014   Cordeiro et al.
(Continued)

FOREIGN PATENT DOCUMENTS

CN          102610909 A       7/2012
CN          103052086 A       4/2013
(Continued)

OTHER PUBLICATIONS

Machine Translation and Abstract of Chinese Publication No. CN102610909, Jul. 25, 2012, 11 pages.
(Continued)

*Primary Examiner* — Nathan S Taylor
(74) *Attorney, Agent, or Firm* — Conley Rose, P.C.

(57) ABSTRACT

A method and an apparatus for aligning antenna beams in a high-low frequency co-site network, where the method includes performing antenna alignment of a low frequency beam with a communications device in order to establish a low frequency channel, and performing high frequency beam alignment of a high frequency antenna with the communications device using the low frequency channel. In the method, high frequency beam alignment of a high frequency antenna is performed using an established low frequency channel. Therefore, a technical problem that a high frequency beam alignment time of a high frequency antenna is long due to a narrow field of view of a high frequency beam can be avoided in order to quickly implement high frequency beam alignment of a high frequency antenna.

15 Claims, 9 Drawing Sheets

Related U.S. Application Data continuation of application No. PCT/CN2014/095302, filed on Dec. 29, 2014.

(51) Int. Cl.
| | |
|---|---|
| *H04W 16/28* | (2009.01) |
| *H04W 72/08* | (2009.01) |
| *G01S 5/00* | (2006.01) |
| *H04B 7/06* | (2006.01) |
| *H04W 84/04* | (2009.01) |

(52) U.S. Cl.
CPC .......... *H04B 7/0695* (2013.01); *H04W 16/28* (2013.01); *H04W 64/00* (2013.01); *H04W 64/006* (2013.01); *H04W 72/085* (2013.01); *H04W 72/046* (2013.01); *H04W 72/0446* (2013.01); *H04W 72/0453* (2013.01); *H04W 84/045* (2013.01)

(58) Field of Classification Search
CPC ............. H04W 72/048; H04W 72/085; H04W 84/045; H04W 64/00; H04W 76/10; H04W 88/06; H04W 16/32; H04W 4/023; H04W 52/38; H04W 72/0413; H04W 76/15; G01S 5/0072; H04B 7/00; H04B 7/0619
USPC ........................... 455/452.1, 450, 452, 552.1
See application file for complete search history.

(56) References Cited

U.S. PATENT DOCUMENTS

| | | | | |
|---|---|---|---|---|
| 2014/0218236 A1* | 8/2014 | Sadeghi | ................ | H04W 16/28 342/367 |
| 2015/0045048 A1* | 2/2015 | Xu | ........................ | H04W 4/023 455/452.1 |
| 2015/0325912 A1* | 11/2015 | Liu | ....................... | H01Q 1/1257 342/368 |
| 2015/0351135 A1* | 12/2015 | Schmidt | ................ | H04W 76/10 455/450 |
| 2016/0099763 A1 | 4/2016 | Chen | | |
| 2016/0112970 A1 | 4/2016 | Chen et al. | | |
| 2016/0174258 A1* | 6/2016 | Wang | .................... | H04W 16/28 370/329 |
| 2018/0192384 A1* | 7/2018 | Chou | .................. | H04W 56/001 |
| 2018/0309488 A1* | 10/2018 | Huang | ...................... | H04L 1/16 |

FOREIGN PATENT DOCUMENTS

| | | |
|---|---|---|
| CN | 103560336 A | 2/2014 |
| CN | 104185269 A | 12/2014 |
| EP | 2945411 A1 | 11/2015 |
| GB | 2514548 A | 5/2013 |
| WO | 2013089731 A1 | 6/2013 |
| WO | 2014114237 A1 | 7/2014 |

OTHER PUBLICATIONS

Machine Translation and Abstract of Chinese Publication No. CN103560336, Feb. 5, 2014, 14 pages.
Foreign Communication From a Counterpart Application, European Application No. 14909304.9, Extended European Search Report dated Nov. 28, 2017, 5 pages.
Foreign Communication From a Counterpart Application, PCT Application No. PCT/CN2014/095302, English Translation of International Search Report dated Oct. 10, 2015, 2 pages.
Foreign Communication From a Counterpart Application, PCT Application No. PCT/CN2014/095302, English Translation of Written Opinion dated Oct. 10, 2015, 6 pages.
Machine Translation and Abstract of Chinese Publication No. CN103052086, Apr. 17, 2013, 47 pages.
Foreign Communication From a Counterpart Application, Chinese Application No. 201480082232.4, Chinese Office Action dated May 22, 2019, 8 pages.

* cited by examiner

METHOD AND APPARATUS FOR ALIGNING ANTENNA BEAMS IN HIGH-LOW FREQUENCY CO-SITE NETWORK

CROSS-REFERENCE TO RELATED APPLICATION

This application is a continuation of U.S. patent application Ser. No. 15/636,254, filed on Jun. 28, 2017, which claims priority to International Patent Application No. PCT/CN2014/095302, filed on Dec. 29, 2014, all of the aforementioned patent applications are hereby incorporated by reference herein in their entireties.

TECHNICAL FIELD

Embodiments of the present disclosure relate to the communications field, and in particular, to a method and an apparatus for aligning antenna beams in a high-low frequency co-site network.

BACKGROUND

In a communications system that includes a macro base station (Macro BS), a small cell (Micro Base Station (Micro BS))/Pico Base Station (Pico BS), and user equipment (UE), the small cell is a base station accessed by UE, and directly serves UE such as a mobile phone, and the Macro BS may connect to a core network using a wired or microwave communication link or the like. A problem in the communications system is how to transmit service data of a terminal user to the Macro BS.

Currently, the foregoing problem is usually resolved using the following two solutions. One solution is to use a wired connection such as a cable or a fiber, but both wiring costs and manpower costs of this solution are extremely high. The other solution is to use a wireless backhaul technology. The wireless backhaul technology may be a microwave, or may be a low-carrier wireless technology based on WI-FI, the 802.16 protocol, or Long Term Evolution (LTE). In order to reduce power and network interference, the wireless backhaul technology generally uses a directional antenna.

The directional antenna is used in the wireless backhaul technology. Therefore, if a signal transmission direction is not aligned with a destination antenna, that is, a maximum gain point of a transmit antenna and a maximum gain point of a destination antenna are not aligned, signal quality is deteriorated, or power is wasted severely. Therefore, how to implement antenna alignment becomes an important problem that needs to be resolved in the wireless backhaul solution.

Compared with a high frequency signal, a low frequency signal has a lower data transmission rate, a wider field of view of a low frequency beam, a lower frequency, and lower power consumption of data transmission and exchange. Compared with a low frequency signal, a high frequency signal has a higher data transmission rate, a narrower field of view of a high frequency beam, a higher frequency, and higher power consumption of data transmission and exchange.

When a frequency of a radio frequency (RF) antenna is relatively low, a field of view of a low frequency antenna beam is relatively wide, and beam alignment does not need to be performed when a low frequency antenna is accessed. When the frequency of the RF antenna is relatively high, a field of view of a high frequency antenna beam is relatively narrow, and high frequency beam alignment of a high frequency antenna needs to be performed when a high frequency antenna is accessed. However, because a field of view of a high frequency beam is narrow, high frequency beam alignment is relatively difficult, and costs a relatively long time.

SUMMARY

Embodiments of the present disclosure provide a method and an apparatus for aligning antenna beams in a high-low frequency co-site network in order to quickly implement high frequency beam alignment of a high frequency antenna.

A first aspect provides a method for aligning antenna beams in a high-low frequency co-site network, including establishing a low frequency channel with a low frequency antenna of a communications device, obtaining location information of the communications device using the low frequency channel, determining a scanning range of the high frequency beam according to the location information of the communications device, and performing high frequency beam alignment of a high frequency antenna with the communications device according to the scanning range of the high frequency beam.

A second aspect provides a method for aligning an antenna in a high-low frequency co-site network, including establishing a low frequency channel with a low frequency antenna of a communications device, obtaining location information of the communications device using the low frequency channel, determining a scanning range of the high frequency beam according to the location information of the communications device, and performing high frequency beam alignment of a high frequency antenna with the communications device according to the scanning range of the high frequency beam.

A third aspect provides an apparatus for aligning antenna beams in a high-low frequency co-site network, including an establishment unit configured to establish a low frequency channel with a low frequency antenna of a communications device, an obtaining unit configured to obtain location information of the communications device using the low frequency channel established by the establishment unit, a determining unit configured to determine a scanning range of the high frequency beam according to the location information of the communications device that is obtained by the obtaining unit, and an alignment unit configured to perform high frequency beam alignment of a high frequency antenna with the communications device according to the scanning range that is of the high frequency beam and is determined by the determining unit.

A fourth aspect provides an apparatus for aligning an antenna in a high-low frequency co-site network, including an establishment unit configured to establish a low frequency channel with a low frequency antenna of a communications device, an obtaining unit configured to obtain location information of the communications device using the low frequency channel established by the establishment unit, a determining unit configured to determine a scanning range of the high frequency beam according to the location information of the communications device that is obtained by the obtaining unit, and an alignment unit configured to perform high frequency beam alignment of a high frequency antenna with the communications device according to the scanning range that is of the high frequency beam and is determined by the determining unit.

In the embodiments of the present disclosure, when performing antenna beam alignment in a high-low frequency co-site network, a base station and a mobile terminal first establish a low frequency channel, and then perform high frequency beam alignment of a high frequency antenna using the low frequency channel. In this way, a technical problem that a high frequency beam alignment time is long due to a narrow field of view of a high frequency beam can be avoided such that high frequency beam alignment of a high frequency antenna can be quickly implemented.

BRIEF DESCRIPTION OF DRAWINGS

In order to describe the technical solutions in the embodiments of the present disclosure more clearly, the following briefly describes the accompanying drawings required for describing the embodiments of the present disclosure. The accompanying drawings in the following description show merely some embodiments of the present disclosure, and a person of ordinary skill in the art may still derive other drawings from these accompanying drawings without creative efforts.

DESCRIPTION OF EMBODIMENTS

The following clearly describes the technical solutions in the embodiments of the present disclosure with reference to the accompanying drawings in the embodiments of the present disclosure. The described embodiments are some rather than all of the embodiments of the present disclosure. All other embodiments obtained by a person of ordinary skill in the art based on the embodiments of the present disclosure without creative efforts shall fall within the protection scope of the present disclosure.

It should be understood that the technical solutions of the embodiments of the present disclosure may be applied to various communications systems, for example, a Global System for Mobile Communications (GSM), a Code Division Multiple Access (CDMA) system, a Wideband Code Division Multiple Access (WCDMA) system, a general packet radio service (GPRS), an LTE system, an LTE frequency division duplex (FDD) system, LTE time division duplex (TDD), a Universal Mobile Telecommunications System (UMTS), or a Worldwide Interoperability for Microwave Access (WIMAX) communications system.

A base station may be a base transceiver station (BTS) in GSM or CDMA, may be a NodeB (NB) in WCDMA, or may be an evolved NodeB (eNB or e-NodeB) in LTE. This is not limited in the present disclosure.

UE may be referred to as a terminal, a mobile station (MS), a mobile terminal, or the like. The UE may communicate with one or more core networks using a radio access network (RAN). For example, the UE may be a mobile phone (or referred to as a "cellular" phone), a computer having a mobile terminal, or the like. Alternatively, the UE may be a portable, pocket-sized, handheld, computer built-in, or in-vehicle mobile apparatus that exchanges voice and/or data with the RAN.

Figure 1:
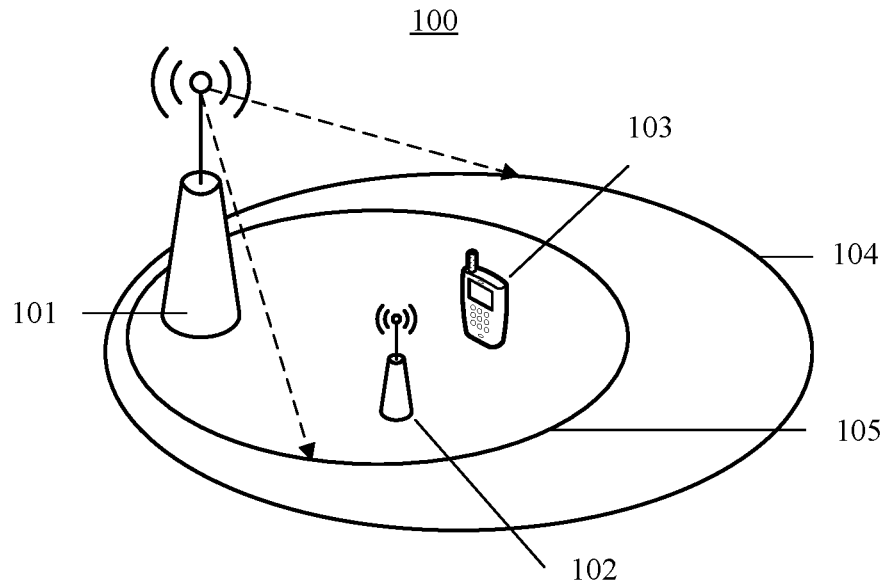
FIG. 1 is a schematic diagram of an example of a system scenario to which embodiments of the present disclosure may be applied.

FIG. 1 is a schematic diagram of an example of a system scenario to which embodiments of the present disclosure may be applied.

As shown in FIG. 1, a high-low frequency co-site network system 100 includes a first communications device and a second communications device. The first communications device may be a base station 101 shown in FIG. 1, or may be an access device such as a hotspot or an access point. The second communications device may be a small cell 102 shown in FIG. 1, or may be a mobile terminal 103 shown in FIG. 1. In the high-low frequency co-site network system 100, the first communications device includes a high frequency antenna and a low frequency antenna, and the second communications device also includes a high frequency antenna and a low frequency antenna. A low frequency antenna has a relatively large coverage area, and a high frequency antenna has a relatively small coverage area. For example, a coverage area of a low frequency antenna of the base station 101 is shown by 104 in FIG. 1, and a coverage area of a high frequency antenna of the base station 101 is shown by 105 in FIG. 1.

In a single-frequency frequency network system, a base station 101 makes no rough estimation of a location of a mobile terminal 103 such that scanning ranges of a base station antenna and a mobile terminal antenna become wide. In addition, the base station 101 and the mobile terminal 103 gave no temporally synchronous handshake to each other, and are completely in a blind scanning state. Consequently, beam alignment costs a long time. Particularly, in a network system having only a high frequency antenna, a coverage area of the high frequency antenna is relatively small, and a field of view of a high frequency beam is relatively narrow. Consequently, high frequency beam alignment of a high frequency antenna is more difficult, and may need a longer time.

For the high-low frequency co-site network system 100 in FIG. 1, for example, the first communications device includes the base station 101, and the second communications device includes the mobile terminal 103. When cell search is synchronized, both low frequency link synchronization between the base station 101 and the mobile terminal 103 and high frequency beam alignment of high frequency antennas of the base station 101 and the mobile terminal 103 need to be performed in order to implement high frequency link synchronization. The base station 101 and the mobile terminal 103 may first perform low frequency link synchronization to establish a low frequency channel, and then exchange high frequency beam alignment information of a high frequency antenna using the successfully established low frequency channel. In this way, high frequency link synchronization can be quickly implemented such that an antenna beam alignment time can be shortened.

Figure 2:
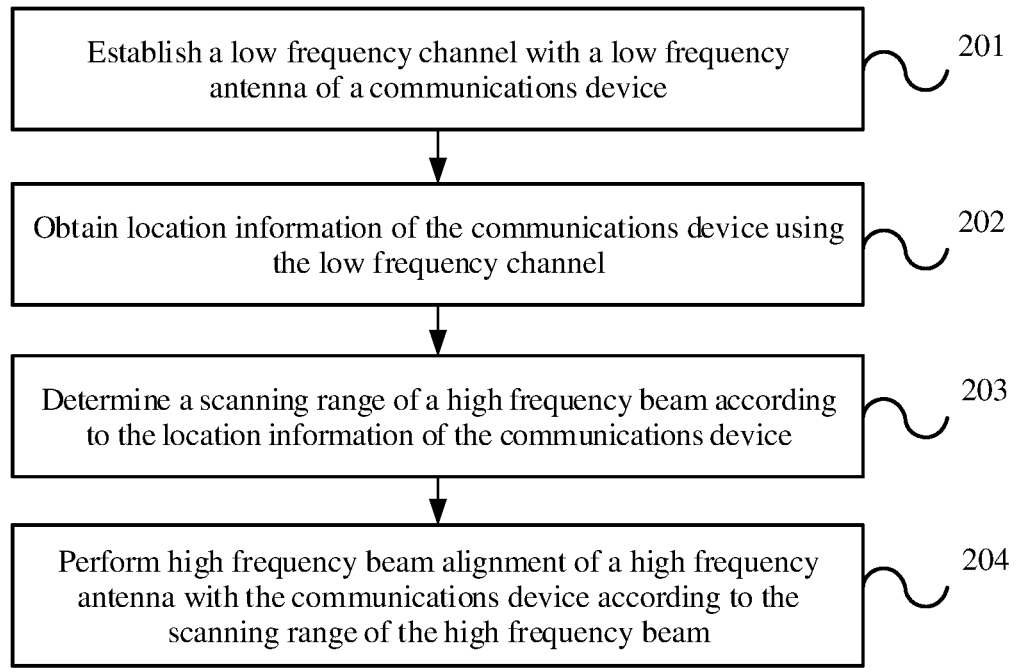
FIG. 2 is a schematic flowchart of a method for aligning antenna beams in a high-low frequency co-site network according to an embodiment of the present disclosure.

FIG. 2 is a schematic flowchart of a method for aligning antenna beams in a high-low frequency co-site network according to an embodiment of the present disclosure. The method in FIG. 2 may be executed by the first communications device (for example, the base station 101) in FIG. 1.

Step 201: Establish a low frequency channel with a low frequency antenna of a communications device.

Step 202: Obtain location information of the communications device using the low frequency channel.

Step 203: Determine a scanning range of a high frequency beam according to the location information of the communications device.

Step 204: Perform high frequency beam alignment of a high frequency antenna with the communications device according to the scanning range of the high frequency beam.

In this embodiment of the present disclosure, when performing antenna beam alignment in a high-low frequency co-site network, a base station and a mobile terminal first establish a low frequency channel, and then perform high frequency beam alignment of a high frequency antenna using the low frequency channel. In this way, a technical problem that a high frequency beam alignment time of a high frequency antenna is long due to a narrow field of view of a high frequency beam can be avoided such that high frequency beam alignment of a high frequency antenna can be quickly implemented.

This embodiment of the present disclosure provides description using an example in which a first communications device is a base station, such as the base station 101 shown in FIG. 1, and a second communications device is a mobile terminal, such as the mobile terminal 103 shown in FIG. 1. However, the present disclosure is not limited thereto.

In step 201, the mobile terminal scans a low frequency beam of the base station using a low-frequency wide beam to search for a target cell, and then completes procedures such as symbol-level timing detection, radio frame clock detection, and cell identity (ID) detection on the low frequency channel to implement low frequency link synchronization.

It should be understood that a low-frequency wide beam sent by the base station may be divided into multiple sectors using an existing beam forming technology, and each sector covers an angle. Alternatively, a low-frequency wide beam sent by the base station may not be divided into sectors. For example, if a coverage area of a base station antenna is 60 degrees(°), the low-frequency wide beam sent by the base station may be divided into four sectors, and a coverage area of each sector is 15°. Then the base station separately performs, in each sector with a coverage area of 15°, direction of arrival (DOA) estimation on a mobile terminal served by the base station. In addition, the low-frequency wide beam sent by the base station may not be divided into sectors, and a low-frequency wide beam with a coverage area of 60° is directly used.

In an embodiment of the present disclosure, after the base station and the mobile terminal establish the low frequency channel, the mobile terminal may determine, according to a data traffic requirement, whether to perform high frequency beam alignment of a high frequency antenna to establish high frequency link synchronization. If the mobile terminal determines to establish high frequency link synchronization, the base station may pre-determine an access right of the mobile terminal. Likewise, the mobile terminal may also pre-determine an access right of the base station in order to avoid an unnecessary high frequency antenna connection.

Optionally, in an embodiment of the present disclosure, after the base station and the mobile terminal establish the low frequency channel, the mobile terminal and the base station may exchange high-frequency frequency information of the two parties using the low frequency channel. In this way, complexity of high frequency beam alignment can be reduced, and high frequency beam alignment of a high frequency antenna can be further quickly implemented.

This embodiment of the present disclosure sets no limitation on a specific method in step 204 in which the base station may perform high frequency beam alignment of a high frequency antenna with the mobile terminal according to the scanning range of the high frequency beam. For example, the base station and the mobile terminal agree on a scanning start time of the high frequency beam, a scanning sector division manner of the high frequency beam, and a quantity of scanning sectors of the high frequency beam, and then the base station performs high frequency beam alignment of high frequency antennas of the base station and the mobile terminal according to first scanning information.

This embodiment of the present disclosure sets no limitation on a method for obtaining location information of the mobile terminal by the base station using the low frequency channel. For example, the base station may receive, using the low frequency channel, the location information of the mobile terminal that is determined using a global positioning system (GPS) and is sent by the mobile terminal. In addition, the base station may further estimate a DOA of a low frequency beam using the low frequency channel in order to obtain DOA information of the low frequency beam, and determine the location information of the mobile terminal using the DOA information. After obtaining the location information of the mobile terminal, the base station may determine the scanning range of the high frequency beam according to the location information, and perform high frequency beam alignment of a high frequency antenna according to the scanning range of the high frequency beam. In this way, technical problems of a large scanning range and a long beam alignment time that are caused by blind scanning performed when the base station does not exchange information with the mobile terminal can be avoided such that high frequency beam alignment of a high frequency antenna can be accelerated, and antenna beam alignment time can be shortened.

The base station may further receive, using the low frequency channel, the location information of the mobile terminal that is sent by the mobile terminal, and then estimate the DOA of the low frequency beam using the low frequency channel, to obtain the DOA information of the low frequency beam. The base station may further narrow a range of the location information of the mobile terminal with reference to the DOA information. In this way, a scanning range of a beam can be further narrowed, and high frequency beam alignment of a high frequency antenna can be further accelerated.

The scanning range of the high frequency beam determined by the base station according to the location information of the mobile terminal may be as follows. The range of the location information of the mobile terminal is considered as the scanning range of the high frequency beam, or may be the scanning range of the high frequency beam is slightly larger than the range of the location information of the mobile terminal. This is not limited in this embodiment of the present disclosure.

The following describes this embodiment of the present disclosure in detail with reference to specific examples. It should be noted that these examples are merely intended to help a person skilled in the art to better understand this embodiment of the present disclosure, but are not intended to limit the scope of this embodiment of the present disclosure.

Optionally, in an embodiment of the present disclosure, performing high frequency beam alignment of a high frequency antenna with the communications device according to the scanning range of the high frequency beam includes sending M high-frequency narrow beams to the communications device according to the scanning range of the high frequency beam, where each high-frequency narrow beam carries ID information used to indicate an ID of each high-frequency narrow beam, and M is a positive integer, receiving a first ID, of a first high-frequency narrow beam, that corresponds to a first maximum receiving statistic and is sent by the communications device, where the first maximum receiving statistic is a maximum value in M receiving statistics of received signals on the M high-frequency narrow beams received by the communications device, and the first high-frequency narrow beam is one of the M high-frequency narrow beams, sending the first high-frequency narrow beam to the communications device, and performing high frequency beam alignment of a high frequency antenna with the communications device according to the first ID.

The mobile terminal initiates a high frequency link synchronization connection request after the base station and the mobile terminal establish low frequency link synchronization. After receiving the high frequency link synchronization connection request, the base station feeds back a high frequency link synchronization connection response to the mobile terminal. If the base station consents to establish a high frequency link synchronization connection, the base station may estimate, using the low frequency channel, the DOA indicating a direction from which the low frequency beam arrives at the mobile terminal in order to obtain the DOA information of the low frequency beam. The DOA information herein includes an estimated DOA range. Afterwards, the base station scans and sends M high-frequency narrow beams at an angle in the estimated DOA range according to the DOA information. In addition, each high-frequency narrow beam carries ID information used to indicate an ID of each high-frequency narrow beam. Then, the mobile terminal receives, using a high-frequency wide beam (a wide acceptance angle), the M high-frequency narrow beams sent by the base station. After the mobile terminal receives the high-frequency narrow beams, the mobile terminal parses IDs of the high-frequency narrow beams. If the mobile terminal cannot obtain an ID of any high-frequency narrow beam by means of parsing, the mobile terminal resends the high-frequency narrow beams in another direction range, and performs searching and high frequency link synchronization in another direction. If the mobile terminal can obtain the IDs of the high-frequency narrow beams by means of parsing, the mobile terminal then calculates receiving statistics of received signals on all the high-frequency narrow beams, determines an ID of a high-frequency narrow beam with a maximum receiving statistic, and denotes the ID as a first ID. Then, the mobile terminal sends the first ID to the base station using the low frequency channel, and denotes the high-frequency narrow beam with a maximum receiving statistic as a first high-frequency narrow beam. After receiving the first ID sent by the mobile terminal, the base station sends the first high-frequency narrow beam to the mobile terminal. The mobile terminal receives the first high-frequency narrow beam in different directions using G high-frequency narrow beams, and calculates G receiving statistics of received signals on the G high-frequency narrow beams to obtain an ID corresponding to a high-frequency narrow beam with a maximum receiving statistic in the G high-frequency narrow beams, and denotes the ID as a second ID. Finally, the base station may perform high frequency beam alignment of a high frequency antenna with the mobile terminal according to the first ID and the second ID in order to establish high frequency link synchronization.

The first ID is an ID corresponding to a high-frequency narrow beam in the M high-frequency narrow beams sent by the base station, where a received signal on the high-frequency narrow beam has a maximum receiving statistic, and the second ID is an ID corresponding to a high-frequency narrow beam in the G high-frequency narrow beams of the mobile terminal, where a received signal on the high-frequency narrow beam has a maximum receiving statistic.

The base station sends a high-frequency narrow beam to the mobile terminal, and the high-frequency narrow beam herein may be a high-frequency narrow beam in a low modulation mode. In this way, a probability of synchronization between the base station and the mobile terminal can be increased, and low signal-to-noise ratio (SNR) communication between the base station and the mobile terminal can be further implemented.

This embodiment of the present disclosure sets no limitation on the receiving statistic. For example, the receiving statistic may be power, may be a received signal level (RSL), or may be an SNR. A person skilled in the art may design a receiving statistic in another form according to a requirement, and such design falls within the scope of this embodiment of the present disclosure as long as a designed receiving statistic can indicate signal strength or signal energy.

Before step 204, the base station and the mobile terminal may determine a scanning start time using the low frequency channel. The base station and the mobile terminal determine to start scanning at a same moment (for example, 10 milliseconds (ms) later), and start to perform high-frequency beam alignment of a high frequency antenna at the scanning start time. The scanning start time herein may be a first time on which the base station and the mobile terminal agree, may be a second time sent by the base station to the mobile terminal using the low frequency channel, or may be a third time sent by the mobile terminal to the base station using the low frequency channel. Any two of the first time, the second time, and the third time may be the same, or may be different.

Optionally, in another embodiment of the present disclosure, for step 204, the base station and the mobile terminal may agree on first scanning information using the low frequency channel, and then perform high frequency beam alignment between high frequency antennas of the base station and the mobile terminal according to the scanning range of the high frequency beam and the first scanning information. The first scanning information is used to indicate a scanning sector division manner or a quantity of scanning sectors of the base station and a scanning sector division manner or a quantity of scanning sectors of the mobile terminal. For example, the quantity of scanning sectors of the mobile terminal is N, and the quantity of scanning sectors of the base station is Q, N is a positive integer, and Q is a positive integer.

The Q scanning sectors of the base station are separately denoted as $B_1, B_2, B_3, \ldots$, and $B_Q$, and the N scanning sectors of the mobile terminal are separately denoted as $U_1, U_2, U_3, \ldots$, and $U_N$. The base station sends a high-frequency narrow beam to the mobile terminal in a first scanning sector according to the first scanning information, and the mobile terminal receives the high-frequency narrow beam in a second scanning sector. The first scanning sector is any one of the Q scanning sectors, and the second scanning sector is any one of the N scanning sectors. For example, the base station first sends a high-frequency narrow beam of the region $B_1$ to the mobile terminal in the region $B_1$ according to the first scanning information, and the sending step lasts for a period of time $T_1$. The mobile terminal successively receives, within $T_1$, the high-frequency narrow beam of the region $B_1$ in each region of the regions $U_1, U_2, U_3, \ldots$, and $U_N$. Afterwards, the base station sends a high-frequency narrow beam of the region $B_2$ to the mobile terminal in the region $B_2$, and the sending step lasts for a period of time $T_1$. The mobile terminal separately and successively receives, within $T_1$, the high-frequency narrow beam of the region $B_2$ in $U_1, U_2, U_3, \ldots$, and $U_N$. In this way, the base station successively sends Q high-frequency narrow beams to the mobile terminal in the regions $B_1, B_2, B_3, \ldots$, and $B_Q$. The mobile terminal receives, using Q×N high-frequency narrow beams in total, the Q high-frequency narrow beams sent by the base station, determines Q×N receiving statistics of received signals on the Q×N high-frequency narrow beams that are in a one-to-one correspondence with the Q scanning sectors and the N scanning sectors, and records the Q×N receiving statistics in a Q×N matrix. Then, the mobile terminal sends a first serial number q of the first scanning sector and a second serial number n of the second scanning sector to the base station, where the first serial number q and the second serial number n correspond to a maximum receiving statistic in the Q×N receiving statistics. Finally, the base station and the mobile terminal point a transmit beam and a receive beam to a direction of the maximum receiving statistic according to the first serial number and the second serial number in order to perform high frequency beam alignment of a high frequency antenna.

It should be understood that the Q high-frequency narrow beams sent in the regions $B_1, B_2, B_3, \ldots$, and $B_Q$ may be a same high-frequency narrow beam, or may be different high-frequency narrow beams. This is not limited in this embodiment of the present disclosure.

For example, the first scanning information is that a base station antenna is divided into ten sectors that are separately denoted as $B_1, B_2, B_3, \ldots$, and $B_{10}$, and that a mobile terminal antenna is divided into five sectors that are separately denoted as $U_1, U_2, U_3, \ldots$, and $U_5$. If a coverage area of the base station antenna is 120°, the base station evenly divides the coverage area into ten sectors, and a coverage area of each sector antenna is 12°. Likewise, if a coverage area of the mobile terminal antenna is 60°, the mobile terminal evenly divides the coverage area into five sectors, and a coverage area of each sector antenna is 12°. After using the low frequency channel, the base station sends the first scanning information to the mobile terminal, or receives the first scanning information sent by the mobile terminal, the base station first sends a 12° high-frequency narrow beam to the mobile terminal at an angle (for example, an angle $B_1$), and the sending step lasts for 5 ms. Within the time of 5 ms during which the base station continuously sends the 12° high-frequency narrow beam, the mobile terminal separately and successively receives, in the ranges $U_1, U_2, U_3, \ldots$, and $U_5$, the 12° high-frequency narrow beam using a high-frequency narrow beam. That is, the mobile terminal first receives the high-frequency narrow beam at a 12° acceptance angle in a direction $U_1$, and the receiving step lasts for 1 ms. Then receives the high-frequency narrow beam at a 12° acceptance angle in a direction $U_2$, and the receiving step lasts for 1 ms, receives the high-frequency narrow beam at a 12° acceptance angle in a direction $U_3$, and the receiving step lasts for 1 ms, receives the high-frequency narrow beam at a 12° acceptance angle in a direction $U_4$, and the receiving step lasts for 1 ms, and receives the high-frequency narrow beam at a 12° acceptance angle in a direction $U_5$, and the receiving step lasts for 1 ms. In addition, the mobile terminal records a power value at which a signal is received at each 1 ms using the high-frequency narrow beam.

Likewise, according to the foregoing method, the base station then successively sends the 12° high-frequency narrow beam to the mobile terminal at angles $B_2, B_3, \ldots$, and $B_{10}$, and the sending step lasts for 5 ms. Likewise, the mobile terminal separately and successively receives the high-frequency narrow beam in the ranges $U_1, U_2, U_3, \ldots$, and $U_5$, and separately receives the high-frequency narrow beam at a 12° acceptance angle in the directions $U_1, U_2, U_3, U_4$, and $U_5$, and the receiving steps respectively lasts for 1 ms. In addition, the mobile terminal records a power value at which a signal is received at each 1 ms using the high-frequency narrow beam. In this way, it takes 50 ms to complete the foregoing cyclic process. After high-frequency narrow beam scanning of the base station and the mobile terminal ends, 50 (that is, 10×5) power values are obtained in total and denoted in a 10×5 matrix. The mobile terminal sends, to the base station using the low frequency channel, a row sequence number and a column sequence number that correspond to a matrix element with maximum power, that is, a first serial number of the ten scanning sectors on the base station side and a second serial number of the five scanning sectors on the mobile terminal side, where the first serial number and the second serial number correspond to the matrix element with maximum power. Alternatively, the mobile terminal sends a 10×5 matrix to the base station using the low frequency channel, and obtains, using the matrix, a first serial number of the ten scanning sectors on the base station side and a second serial number of the five scanning sectors on the mobile terminal side, where the first serial number and the second serial number correspond to the matrix element with maximum power. Finally, the base station and the mobile terminal point the transmit beam and the receive beam to a direction of the maximum power according to the first serial number and the second serial number in order to perform high frequency beam alignment of a high frequency antenna.

Therefore, in this embodiment of the present disclosure, a base station and a mobile terminal agree on scanning information, and perform high frequency beam alignment between high frequency antennas of the base station and the mobile terminal according to the scanning information. In this way, a technical problem of a long beam alignment time that is caused by blind scanning performed when the base station has no temporally synchronous handshake with the mobile terminal can be avoided such that high frequency beam alignment of a high frequency antenna can be accelerated.

It should be understood that in an embodiment of the present disclosure, when a serial number of a scanning sector is determined, description is provided using only a scanning sector corresponding to maximum power as an example, or using another scanning sector corresponding to a maximum receiving statistic such as an SNR or an RSL as an example. However, the present disclosure is not limited thereto.

In another embodiment of the present disclosure, after the mobile terminal sends, to the base station according to the foregoing method using the low frequency channel, the first serial number corresponding to the scanning sector on the base station side and the second serial number corresponding to the scanning sector on the mobile terminal side, where the first serial number and the second serial number correspond to the matrix element with maximum power, or after the mobile terminal sends a Q×N matrix to the base station using the low frequency channel, the base station and the mobile terminal exchange, using the low frequency channel, information indicating that fine scanning continues to be performed, that is, determine second scanning information. For example, the base station and the mobile terminal agree on a scanning sub-sector division manner or a quantity of scanning sub-sectors of a scanning sector corresponding to the first serial number and a scanning sub-sector division manner or a quantity of scanning sub-sectors of a scanning sector corresponding to the second serial number. It is assumed that the quantity of scanning sub-sectors of the scanning sector corresponding to the first serial number is H, and the quantity of scanning sub-sectors of the scanning sector corresponding to the second serial number is P. The H scanning sub-sectors are separately denoted as $B_{q1}$, $B_{q2}$, $B_{q3}$, . . . , and $B_{qH}$, and the P scanning sub-sectors are separately denoted $U_{n1}$, $U_{n2}$, $U_{n3}$, . . . , and $U_{nP}$. The base station sends a high-frequency narrow beam to the mobile terminal in a third scanning sector according to the second scanning information, and the mobile terminal receives the high-frequency narrow beam in a fourth scanning sector. The third scanning sector is any one of the H scanning sub-sectors, and the fourth scanning sector is any one of the P scanning sub-sectors.

Further, the base station first sends a high-frequency narrow beam of the region $B_{q1}$ to the mobile terminal in the region $B_{q1}$ according to the second scanning information, and the sending step lasts for $T_2$. The mobile terminal separately receives, within $T_2$ in the regions $U_{n1}$, $U_{n2}$, $U_{n3}$, . . . , and $U_{nP}$ using P high-frequency narrow beams, the high-frequency narrow beam sent by the base station in the region $B_{q1}$. Afterwards, the base station sends a high-frequency narrow beam of the region $B_{q2}$ to the mobile terminal in the region $B_{q2}$. The mobile terminal separately receives, within $T_2$ in the regions $U_{n1}$, $U_{n2}$, $U_{n3}$, . . . , and $U_{nP}$ using P high-frequency narrow beams, the high-frequency narrow beam sent by the base station in the region $B_{q2}$. In such a sequence, the base station finally sends a high-frequency narrow beam of the region $B_{qH}$ to the mobile terminal in the region $B_{qH}$. The mobile terminal separately receives, within $T_2$ in the regions $U_{n1}$, $U_{n2}$, $U_{n3}$, . . . , and $U_{nP}$ using P high-frequency narrow beams, the high-frequency narrow beam sent by the base station in the region $B_{qH}$. The mobile terminal receives, using H×P high-frequency narrow beams in total, H high-frequency narrow beams sent by the base station in the H scanning sectors. After receiving the high-frequency narrow beams sent by the base station, the mobile terminal determines H×P receiving statistics of received signals on the H×P high-frequency narrow beams that are in a one-to-one correspondence with the third scanning sector and the fourth scanning sector, and records the H×P receiving statistics in an H×P matrix. Then, the mobile terminal sends a third serial number of the third scanning sector and a fourth serial number of the fourth scanning sector to the base station, where the third serial number and the fourth serial number correspond to a maximum receiving statistic in the H×P receiving statistics. Finally, the base station and the mobile terminal point the transmit beam and the receive beam to a direction of the maximum receiving statistic according to the third serial number and the fourth serial number in order to perform high frequency beam alignment of a high frequency antenna.

In another embodiment of the present disclosure, in multiple scanning processes, the mobile terminal may perform high frequency beam alignment of a high frequency antenna without determining a scanning sector with a strongest signal using a power detection method. For example, the base station may send synchronization sequence information and a pilot. The mobile terminal determines whether the base station and the mobile terminal are synchronized, and obtains, according to a result of the determining, a serial number of a high-frequency narrow beam used for performing high frequency beam alignment of a high frequency antenna, to perform high frequency beam alignment of a high frequency antenna. If the mobile terminal obtains multiple synchronization sequences by means of parsing, high-frequency narrow beams corresponding to the multiple synchronization sequences are used as candidate high-frequency narrow beams required for alignment. The base station and the mobile terminal select an optimal high-frequency narrow beam from the candidate high-frequency narrow beams according to a priority, to perform high frequency beam alignment of a high frequency antenna. If obtaining only one synchronization sequence by means of parsing, the base station and the mobile terminal use a high-frequency narrow beam corresponding to the synchronization sequence as a high-frequency narrow beam used for alignment in order to perform high frequency beam alignment of a high frequency antenna. If the mobile terminal obtains no synchronization sequence by means of parsing, the base station and the mobile terminal cannot be synchronized.

The base station and the mobile terminal may perform scanning multiple times using the low frequency channel. The base station may gradually narrow a location range of the mobile terminal by performing multiple times of scanning, and exchange result information of the multiple times of scanning using the low frequency channel. In this way, accuracy of high frequency beam alignment can be improved, and establishment of high frequency link synchronization can be accelerated. Description is provided herein using only two times of scanning as an example. However, the present disclosure is not limited thereto.

This embodiment of the present disclosure sets no limitation on the receiving statistic. For example, the receiving statistic may be at least one of power, an SNR, or an RSL.

The method for aligning antenna beams in a high-low frequency co-site network according to this embodiment of the present disclosure is described in detail above from a perspective of a base station with reference to FIG. 2. The following describes a method for aligning antenna beams in a high-low frequency co-site network according to an embodiment of the present disclosure from a perspective of a mobile terminal with reference to FIG. 3.

Figure 3:
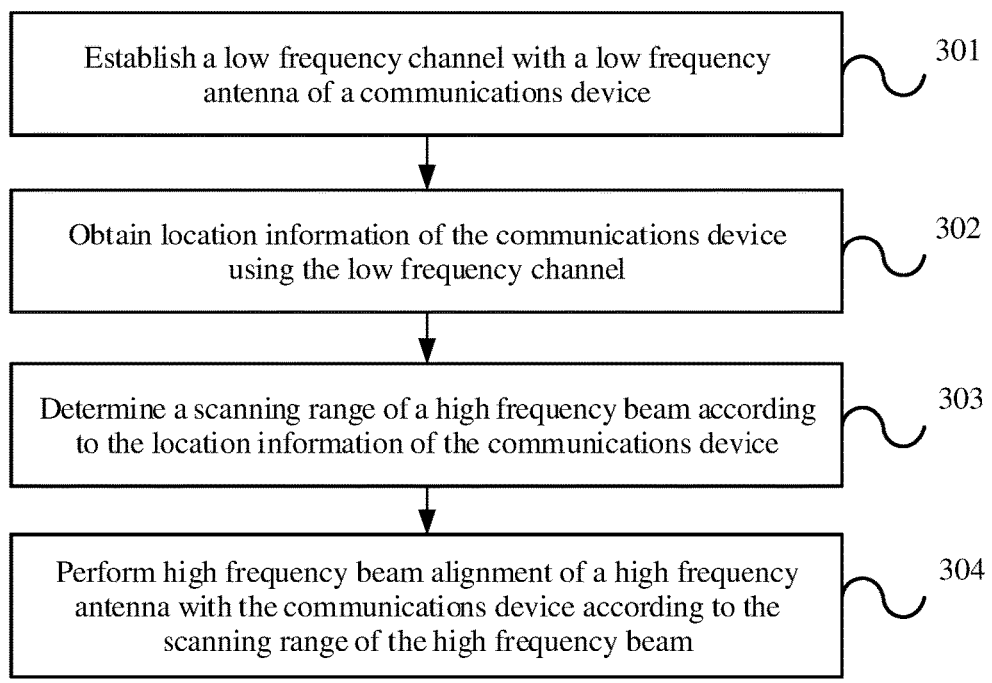
FIG. 3 is a schematic flowchart of a method for aligning antenna beams in a high-low frequency co-site network according to another embodiment of the present disclosure.

FIG. 3 is a schematic flowchart of a method for aligning antenna beams in a high-low frequency co-site network according to another embodiment of the present disclosure. The method in FIG. 3 may be executed by a second communications device (for example, the mobile terminal 103 in FIG. 1).

Step 301: Establish a low frequency channel with a low frequency antenna of a communications device, where the communications device may be a base station, such as the base station 101 in FIG. 1.

Step 302: Obtain location information of the communications device using the low frequency channel.

Step 303: Determine a scanning range of a high frequency beam according to the location information of the communications device.

Step 304: Perform high frequency beam alignment of a high frequency antenna with the communications device according to the scanning range of the high frequency beam.

In this embodiment of the present disclosure, when performing antenna beam alignment in a high-low frequency co-site network, a base station and a mobile terminal first establish a low frequency channel, and then perform high frequency beam alignment of a high frequency antenna using the low frequency channel. In this way, a technical problem that a high frequency beam alignment time of a high frequency antenna is long due to a narrow field of view of a high frequency beam can be avoided such that high frequency beam alignment of a high frequency antenna can be quickly implemented.

Description is provided herein using an example in which a first communications device is a base station, such as the base station 101 in the FIG. 1, and a second communications device is a mobile terminal, such as the mobile terminal 103 in FIG. 1. However, the present disclosure is not limited thereto.

In step 301, the mobile terminal scans a low frequency beam of the base station using a low-frequency wide beam to search for a target cell, and then completes procedures such as symbol-level timing detection, radio frame clock detection, and cell ID detection on the low frequency channel, to complete low frequency link synchronization.

Further, the mobile terminal scans, sends, and receives the low-frequency wide beam of the base station to search for a target cell in order to obtain downlink synchronization information of the target cell and related configuration information of the target cell. The mobile terminal that is just powered on can obtain information such as time-frequency synchronization and a cell ID of an optimal target cell only after the mobile terminal initiates a cell search command, and the mobile terminal may receive system information after completing cell search. Afterwards, the mobile terminal detects a physical synchronization channel (PSCH), a secondary synchronization channel (SSCH), a downlink reference signal, and the like to complete the procedures such as symbol-level timing detection, radio frame clock detection, and cell ID detection. After completing the detection procedures, the mobile terminal may detect a public land mobile network (PLMN) identifier from the system information, select a cell according to the PLMN identifier, and complete low frequency link synchronization between the base station and the mobile terminal in order to establish the low frequency channel.

In an embodiment of the present disclosure, after the base station and the mobile terminal establish the low frequency channel, the mobile terminal may determine, according to a data traffic requirement, whether to perform high frequency beam alignment of a high frequency antenna to establish high frequency link synchronization. If the mobile terminal determines to establish high frequency link synchronization, the base station may pre-determine an access right of the mobile terminal. Likewise, the mobile terminal may also pre-determine an access right of the base station, to avoid an unnecessary high frequency antenna connection.

Optionally, in an embodiment of the present disclosure, after the base station and the mobile terminal establish the low frequency channel, the mobile terminal and the base station may exchange high-frequency frequency information of the two parties using the low frequency channel. In this way, complexity of high frequency beam alignment can be reduced, and high frequency beam alignment of a high frequency antenna can be further quickly implemented.

This embodiment of the present disclosure sets no limitation on a method for obtaining the location information of the communications device. For example, the location information of the communications device that is determined using a GPS and is sent by the communications device may be received using the low frequency channel.

The following describes this embodiment of the present disclosure in detail with reference to specific examples. It should be noted that these examples are merely intended to help a person skilled in the art to better understand this embodiment of the present disclosure, but are not intended to limit the scope of this embodiment of the present disclosure.

Optionally, in an embodiment of the present disclosure, performing high frequency beam alignment of a high frequency antenna with the communications device according to the scanning range of the high frequency beam includes receiving M high-frequency narrow beams sent by the communications device, where each high-frequency narrow beam carries ID information used to indicate an ID of each high-frequency narrow beam, determining M receiving statistics that are of received signals on the high-frequency narrow beams and correspond to the M high-frequency narrow beams, sending, to the communications device, a first ID that is of a first high-frequency narrow beam and corresponds to a first maximum receiving statistic, where the first maximum receiving statistic is a maximum value in the M receiving statistics, and the first high-frequency narrow beam is one of the M high-frequency narrow beams, receiving, using G high-frequency narrow beams, the first high-frequency narrow beam sent by the communications device, determining a second ID of a high-frequency narrow beam in the G high-frequency narrow beams, where a received signal on the high-frequency narrow beam has a maximum receiving statistic, and performing high frequency beam alignment of a high frequency antenna with the communications device according to the first ID and the second ID.

For example, after the mobile terminal and the base station establish low frequency link synchronization, the mobile terminal sends a high frequency link synchronization connection request to the base station, and receives a high frequency link synchronization connection response fed back by the base station. When receiving the connection response that is sent by the base station and indicates that the base station consents to establish high frequency link synchronization, the mobile terminal receives, using a low-frequency wide beam (a wide acceptance angle), M high-frequency narrow beams sent by the base station. It should be understood that the mobile terminal may receive the high-frequency narrow beams at a sector angle, or may receive the high-frequency narrow beams using an omnidirectional antenna. After the mobile terminal receives the high-frequency narrow beams, the mobile terminal parses IDs of the high-frequency narrow beams. If the mobile terminal cannot obtain an ID of any high-frequency narrow beam by means of parsing, the mobile terminal resends the high-frequency narrow beams in another direction range, and performs searching and high frequency link synchronization in another direction. If the mobile terminal can obtain the IDs of the high-frequency narrow beams by means of parsing, the mobile terminal then calculates receiving statistics of received signals on all the high-frequency narrow beams, determines an ID of a high-frequency narrow beam with a maximum receiving statistic, and denotes the ID as a first ID. Then, the mobile terminal sends the first ID to the base station using the low frequency channel, and denotes the high-frequency narrow beam with a maximum receiving statistic as a first high-frequency narrow beam. The mobile terminal receives the first high-frequency narrow beam sent by the base station according to the first ID. The mobile terminal receives the first high-frequency narrow beam in different directions using G high-frequency narrow beams, and calculates G receiving statistics of receives signal on the G high-frequency narrow beams to obtain an ID corresponding to a high-frequency narrow beam in the G high-frequency narrow beams, where a received signal on the high-frequency narrow beam has a maximum receiving statistic, and denotes the ID as a second ID. Finally, the mobile terminal may perform high frequency beam alignment of a high frequency antenna with the base station according to the first ID and the second ID in order to establish high frequency link synchronization.

The first ID is an ID corresponding to a high-frequency narrow beam in the M high-frequency narrow beams sent by the base station, where a received signal on the high-frequency narrow beam has a maximum receiving statistic, and the second ID is an ID corresponding to a high-frequency narrow beam in the G high-frequency narrow beams of the mobile terminal, where a received signal on the high-frequency narrow beam has a maximum receiving statistic.

This embodiment of the present disclosure sets no limitation on the receiving statistic. For example, the receiving statistic may be power, may be an RSL, or may be an SNR. A person skilled in the art may design a receiving statistic in another form according to a requirement, and such design falls within the scope of this embodiment of the present disclosure as long as a designed receiving statistic can indicate signal strength or signal energy.

Optionally, the base station and the mobile terminal may determine a scanning start time using the low frequency channel. The base station and the mobile terminal determine to start scanning at a same moment (for example, 10 ms later), and start to perform high-frequency beam alignment of a high frequency antenna at the scanning start time. The scanning start time herein may be a first time on which the base station and the mobile terminal agree, may be a second time sent by the base station to the mobile terminal using the low frequency channel, or may be a third time sent by the mobile terminal to the base station using the low frequency channel. Any two of the first time, the second time, and the third time may be the same, or may be different.

Optionally, in another embodiment of the present disclosure, the mobile terminal and the base station may agree on first scanning information using the low frequency channel, and then perform high frequency beam alignment between high frequency antennas of the base station and the mobile terminal according to the scanning range of the high frequency beam and the first scanning information. The first scanning information is used to indicate a scanning sector division manner or a quantity of scanning sectors of the base station and a scanning sector division manner or a quantity of scanning sectors of a mobile device. For example, the quantity of scanning sectors of the mobile terminal is N, and the quantity of scanning sectors of the base station is Q, N is a positive integer, and Q is a positive integer.

The Q scanning sectors of the base station are separately denoted as $B_1$, $B_2$, $B_3$, . . . , and $B_Q$, and the N scanning sectors of the mobile terminal are separately denoted as $U_1$, $U_2$, $U_3$, . . . , and $U_N$. The base station sends a high-frequency narrow beam to the mobile terminal in a first scanning sector according to the first scanning information, and the mobile terminal receives the high-frequency narrow beam in a second scanning sector. The first scanning sector is any one of the Q scanning sectors, and the second scanning sector is any one of the N scanning sectors. For example, the base station first sends a high-frequency narrow beam of the region $B_1$ to the mobile terminal in the region $B_1$ according to the first scanning information, and the sending step lasts for a period of time $T_1$. The mobile terminal successively receives, within $T_1$, the high-frequency narrow beam of the region $B_1$ in each region of the regions $U_1$, $U_2$, $U_3$, . . . , and $U_N$. Afterwards, the base station sends a high-frequency narrow beam of the region $B_2$ to the mobile terminal in the region $B_2$, and the sending step lasts for a period of time $T_1$. The mobile terminal separately and successively receives, within $T_1$, the high-frequency narrow beam of the region $B_2$ in $U_1$, $U_2$, $U_3$, . . . , and $U_N$. In this way, the base station successively sends Q high-frequency narrow beams to the mobile terminal in the regions $B_1$, $B_2$, $B_3$, . . . , and $B_Q$. The mobile terminal receives, using Q×N high-frequency narrow beams in total, the Q high-frequency narrow beams sent by the base station, determines Q×N receiving statistics of received signals on the Q×N high-frequency narrow beams that are in a one-to-one correspondence with the Q scanning sectors and the N scanning sectors, and records the Q×N receiving statistics in a Q×N matrix. Then, the mobile terminal sends a first serial number q of the first scanning sector and a second serial number n of the second scanning sector to the base station, where the first serial number q and the second serial number n correspond to a maximum receiving statistic in the Q×N receiving statistics. Finally, the base station and the mobile terminal point a transmit beam and a receive beam to a direction of the maximum receiving statistic according to the first serial number and the second serial number, to perform high frequency beam alignment of a high frequency antenna.

It should be understood that the Q high-frequency narrow beams sent in the regions $B_1$, $B_2$ $B_3$, . . . , and $B_Q$ may be a same high-frequency narrow beam, or may be different high-frequency narrow beams. This is not limited in this embodiment of the present disclosure.

For example, the first scanning information is that a base station antenna is divided into ten sectors that are separately denoted as $B_1$, $B_2$, $B_3$, . . . , and $B_{10}$, and that a mobile terminal antenna is divided into five sectors that are separately denoted as $U_1$, $U_2$, $U_3$ . . . . If a coverage area of the base station antenna is 120°, the base station evenly divides the coverage area into ten sectors, and a coverage area of each sector antenna is 12°. Likewise, if a coverage area of the mobile terminal antenna is 60°, the mobile terminal evenly divides the coverage area into five sectors, and a coverage area of each sector antenna is 12°. After using the low frequency channel, the base station sends the first scanning information to the mobile terminal, or receives the first scanning information sent by the mobile terminal, the base station first sends a 12° high-frequency narrow beam to the mobile terminal at an angle (for example, an angle $B_1$), and the sending step lasts for 5 ms. Within the time of 5 ms during which the base station continuously sends the 12° high-frequency narrow beam, the mobile terminal separately and successively receives, in the ranges $U_1$, $U_2$, $U_3$, and $U_5$, the 12° high-frequency narrow beam using a high-frequency narrow beam. That is, the mobile terminal first receives the high-frequency narrow beam at a 12° acceptance angle in a direction $U_1$, and the receiving step lasts for 1 ms. Then receives the high-frequency narrow beam at a 12° acceptance angle in a direction $U_2$, and the receiving step lasts for 1 ms, receives the high-frequency narrow beam at a 12° acceptance angle in a direction $U_3$, and the receiving step lasts for 1 ms, receives the high-frequency narrow beam at a 12° acceptance angle in a direction $U_4$, and the receiving step lasts for 1 ms, and receives the high-frequency narrow beam at a 12° acceptance angle in a direction $U_5$, and the receiving step lasts for 1 ms. In addition, the mobile terminal records a power value at which a signal is received at each 1 ms using the high-frequency narrow beam.

Likewise, according to the foregoing method, the base station then successively sends the 12° high-frequency narrow beam to the mobile terminal at angles $B_2$, $B_3$, ..., and $B_{10}$, and the sending step lasts for 5 ms. Likewise, the mobile terminal separately and successively receives the high-frequency narrow beam in the ranges $U_1$, $U_2$, $U_3$, ..., and $U_5$, and separately receives the high-frequency narrow beam at a 12° acceptance angle in the directions $U_1$, $U_2$, $U_3$, $U_4$ and $U_5$, and the receiving steps respectively lasts for 1 ms. In addition, the mobile terminal records a power value at which a signal is received at each 1 ms using the high-frequency narrow beam. In this way, it takes 50 ms to complete the foregoing cyclic process. After high-frequency narrow beam scanning of the base station and the mobile terminal ends, 50 (that is, 10×5) power values are obtained in total and denoted in a 10×5 matrix. The mobile terminal sends, to the base station using the low frequency channel, a row sequence number and a column sequence number that correspond to a matrix element with maximum power, that is, a first serial number of the ten scanning sectors on the base station side and a second serial number of the five scanning sectors on the mobile terminal side, where the first serial number and the second serial number correspond to the matrix element with maximum power. Alternatively, the mobile terminal sends a 10×5 matrix to the base station using the low frequency channel, and obtains, using the matrix, a first serial number of the ten scanning sectors on the base station side and a second serial number of the five scanning sectors on the mobile terminal side, where the first serial number and the second serial number correspond to the matrix element with maximum power. Finally, the base station and the mobile terminal point the transmit beam and the receive beam to a direction of the maximum power according to the first serial number and the second serial number in order to perform high frequency beam alignment of a high frequency antenna.

Therefore, in this embodiment of the present disclosure, a base station and a mobile terminal agree on scanning information, and perform high frequency beam alignment between high frequency antennas of the base station and the mobile terminal according to the scanning information. In this way, a technical problem of a long beam alignment time that is caused by blind scanning performed when the base station has no temporally synchronous handshake with the mobile terminal can be avoided such that high frequency beam alignment of a high frequency antenna can be accelerated.

It should be understood that in an embodiment of the present disclosure, when a serial number of a scanning sector is determined, description is provided using only a scanning sector corresponding to maximum power as an example, or using another scanning sector corresponding to a maximum receiving statistic such as an SNR or an RSL as an example. However, the present disclosure is not limited thereto.

In another embodiment of the present disclosure, after the mobile terminal sends, to the base station according to the foregoing method using the low frequency channel, the first serial number corresponding to the scanning sector on the base station side and the second serial number corresponding to the scanning sector on the mobile terminal side, where the first serial number and the second serial number correspond to the matrix element with maximum power, or after the mobile terminal sends a Q×N matrix to the base station using the low frequency channel, the mobile terminal and the base station may exchange, using the low frequency channel, information indicating that fine scanning continues to be performed, that is, agree on second scanning information. For example, the base station and the mobile terminal agree on second scanning information, for example, agree on a scanning sub-sector division manner or a quantity of scanning sub-sectors of a scanning sector corresponding to the first serial number and a scanning sub-sector division manner or a quantity of scanning sub-sectors of a scanning sector corresponding to the second serial number. It is assumed that the quantity of scanning sub-sectors of the scanning sector corresponding to the first serial number is H, and the quantity of scanning sub-sectors of the scanning sector corresponding to the second serial number is P. The H scanning sub-sectors are separately denoted as $B_{q1}$, $B_{q2}$, $B_{q3}$, ..., and $B_{qH}$, and the P scanning sub-sectors are separately denoted as $U_{n1}$, $U_{n2}$, $U_{n3}$, ..., and $U_{nP}$. The base station sends a high-frequency narrow beam to the mobile terminal in a third scanning sector according to the second scanning information, and the mobile terminal receives the high-frequency narrow beam in a fourth scanning sector. The third scanning sector is any one of the H scanning sub-sectors, and the fourth scanning sector is any one of the P scanning sub-sectors.

Further, the base station first sends a high-frequency narrow beam of the region $B_{q1}$ to the mobile terminal in the region $B_{q1}$ according to the second scanning information, and the sending step lasts for $T_2$. The mobile terminal separately receives, within $T_2$ in the regions $U_{n1}$, $U_{n2}$, $U_{n3}$, ..., and $U_{nP}$ using P high-frequency narrow beams, the high-frequency narrow beam sent by the base station in the region $B_{q1}$. Afterwards, the base station sends a high-frequency narrow beam of the region $B_{q2}$ to the mobile terminal in the region $B_{q2}$. The mobile terminal separately receives, within $T_2$ in the regions $U_{n1}$, $U_{n2}$, $U_{n3}$, ..., and $U_{nP}$ using P high-frequency narrow beams, the high-frequency narrow beam sent by the base station in the region $B_{q2}$. In such a sequence, the base station finally sends a high-frequency narrow beam of the region $B_{qH}$ to the mobile terminal in the region $B_{qH}$. The mobile terminal separately receives, within $T_2$ in the regions $U_{n1}$, $U_{n2}$, $U_{n3}$, ..., and $U_{nP}$ using P high-frequency narrow beams, the high-frequency narrow beam sent by the base station in the region $B_{qH}$. The mobile terminal receives, using H×P high-frequency narrow beams in total, H high-frequency narrow beams sent by the base station in the H scanning sectors.

After receiving the high-frequency narrow beams sent by the base station, the mobile terminal determines H×P receiving statistics of received signals on the H×P high-frequency narrow beams that are in a one-to-one correspondence with the third scanning sector and the fourth scanning sector, and records the H×P receiving statistics in an H×P matrix. Then, the mobile terminal sends a third serial number of the third scanning sector and a fourth serial number of the fourth scanning sector to the base station, where the third serial number and the fourth serial number correspond to a maximum receiving statistic in the H×P receiving statistics. Finally, the base station and the mobile terminal point the transmit beam and the receive beam to a direction of the maximum receiving statistic according to the third serial number and the fourth serial number, to perform high frequency beam alignment of a high frequency antenna.

In another embodiment of the present disclosure, in multiple scanning processes, the mobile terminal may perform high frequency beam alignment of a high frequency antenna without determining a scanning sector with a strongest signal using a power detection method. For example, the base station may send synchronization sequence information and a pilot. The mobile terminal determines whether the base station and the mobile terminal are synchronized, and obtains, according to a result of the determining, a serial number of a high-frequency narrow beam used for performing high frequency beam alignment of a high frequency antenna, to perform high frequency beam alignment of a high frequency antenna. If the mobile terminal obtains multiple synchronization sequences by means of parsing, high-frequency narrow beams corresponding to the multiple synchronization sequences are used as candidate high-frequency narrow beams required for alignment. The base station and the mobile terminal select an optimal high-frequency narrow beam from the candidate high-frequency narrow beams according to a priority, to perform high frequency beam alignment of a high frequency antenna. If obtaining only one synchronization sequence by means of parsing, the base station and the mobile terminal use a high-frequency narrow beam corresponding to the synchronization sequence as a high-frequency narrow beam used for alignment, to perform high frequency beam alignment of a high frequency antenna. If the mobile terminal obtains no synchronization sequence by means of parsing, the base station and the mobile terminal cannot be synchronized.

The mobile terminal and the base station may perform scanning multiple times using the low frequency channel. The base station may gradually narrow a location range of the mobile terminal by performing multiple times of scanning, and exchange result information of the multiple times of scanning using the low frequency channel. In this way, accuracy of high frequency beam alignment can be improved, and establishment of high frequency synchronization can be accelerated. Description is provided herein using only two times of scanning as an example. However, the present disclosure is not limited thereto.

Figure 4:
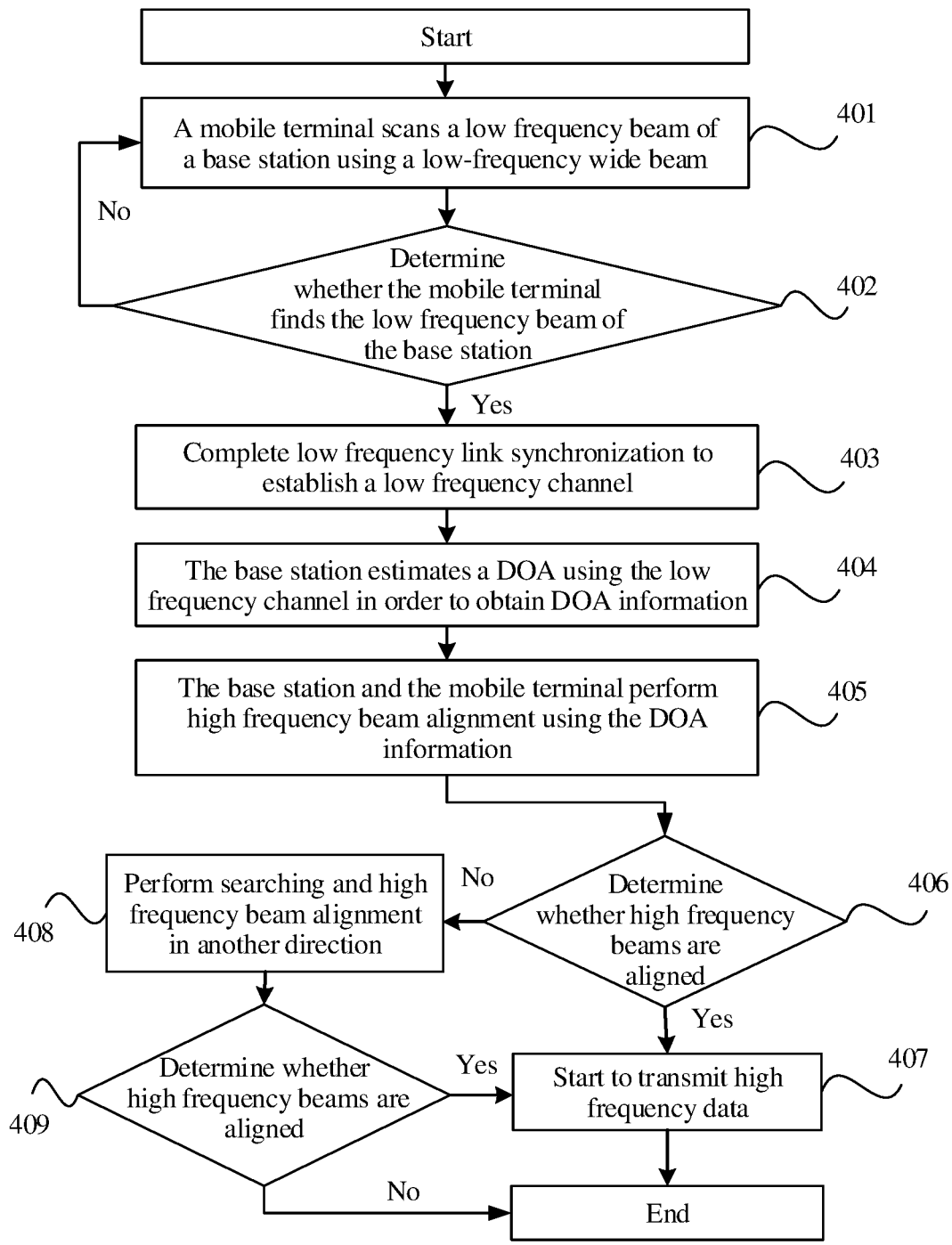
FIG. 4 is a schematic flowchart of a process of aligning antenna beams in a high-low frequency co-site network according to an embodiment of the present disclosure.

The following describes detailed procedures of the embodiments of the present disclosure with reference to FIG. 4 to FIG. 7. FIG. 4 is a schematic flowchart of a process of aligning antenna beams in a high-low frequency co-site network according to an embodiment of the present disclosure.

Step 401: A mobile terminal scans a low frequency beam of a base station using a low-frequency wide beam.

In step 401, the mobile terminal receives, using the low-frequency wide beam, the low frequency beam sent by the base station. The mobile terminal scans, sends, and receives the low-frequency wide beam of the base station to search for a target cell, to obtain downlink synchronization information of the target cell and related configuration information of the target cell. The mobile terminal that is just powered on can obtain information such as time-frequency synchronization and a cell ID of an optimal target cell only after the mobile terminal initiates a cell search command, and the mobile terminal may receive system information after completing cell search.

Step 402: Determine whether the mobile terminal finds the low frequency beam of the base station.

In step 402, it is determined whether the mobile terminal finds the low frequency beam sent by the base station. If the mobile terminal finds the low frequency beam sent by the base station, the mobile terminal performs step 403, and if the mobile terminal does not find the low frequency beam sent by the base station, the mobile terminal returns to step 401 to perform re-scanning.

It should be understood that a low-frequency wide beam sent by the base station may be divided into multiple sectors using an existing beam forming technology, and each sector covers an angle. Alternatively, a low-frequency wide beam sent by the base station may not be divided into sectors. For example, if a coverage area of a base station antenna is 60°, the low-frequency wide beam sent by the base station may be divided into four sectors, and a coverage area of each sector is 15°. Then the base station separately performs, in each sector with a coverage area of 15°, DOA estimation on a mobile terminal served by the base station. In addition, the low-frequency wide beam sent by the base station may not be divided into sectors, and a low-frequency wide beam with a coverage area of 60° is directly used.

Step 403: Complete low frequency link synchronization to establish a low frequency channel.

The mobile terminal detects a PSCH, an SSCH, a downlink reference signal, and the like, to complete procedures such as symbol-level timing detection, radio frame clock detection, and cell ID detection. After completing the detection procedures, the mobile terminal may detect a PLMN identifier from the system information, and complete low frequency link synchronization between the base station and the mobile terminal according to the PLMN identifier to establish the low frequency channel.

In an embodiment of the present disclosure, after the base station and the mobile terminal establish the low frequency channel, the mobile terminal may determine, according to a data traffic requirement, whether to perform high frequency beam alignment of a high frequency antenna to establish high frequency link synchronization. If the mobile terminal determines to establish high frequency link synchronization, the base station may pre-determine an access right of the mobile terminal. Likewise, the mobile terminal may also pre-determine an access right of the base station, to avoid an unnecessary high frequency antenna connection.

Optionally, in another embodiment of the present disclosure, after the base station and the mobile terminal establish the low frequency channel, the mobile terminal and the base station may exchange high-frequency frequency information of the two parties using the low frequency channel. In this way, complexity of high frequency beam alignment can be reduced, and high frequency beam alignment of a high frequency antenna can be further quickly implemented.

Step 404: The base station estimates a DOA using the low frequency channel in order to obtain DOA information.

After the mobile terminal and the base station complete low frequency link synchronization, the mobile terminal initiates a high frequency link synchronization connection request. After receiving the high frequency link synchronization connection request, the base station feeds back a high frequency link synchronization connection response. Afterwards, the base station estimates, using the low frequency channel, the DOA indicating a direction from which the low frequency beam arrives at the mobile terminal, to obtain the DOA information.

Optionally, in an embodiment of the present disclosure, before step 404, the base station may estimate a location of the mobile terminal using the low frequency channel in order to obtain location information of the mobile terminal. For example, the mobile terminal may determine the location information of the mobile terminal using a GPS, and send the location information to the base station. In this way, the base station may narrow a scanning and sending range of a high frequency beam using the location information of the mobile terminal. Likewise, the base station may also determine location information of the base station using the GPS, and send the location information to the mobile terminal. In this way, the mobile terminal may narrow a scanning and receiving range of the high frequency beam using the location information of the base station. Therefore, the base station and the mobile terminal exchange the location information using the GPS such that a scanning and sending/receiving range of a high frequency beam can be further narrowed, a high frequency beam alignment time of a high frequency antenna can be shorten, and high frequency link synchronization can be quickly completed.

Step 405: The base station and the mobile terminal perform high frequency beam alignment using the DOA information.

The DOA information includes a DOA estimation range. The base station and the mobile terminal perform beam scanning, sending, and receiving in the DOA estimation range, and calculate beam power to determine an antenna alignment direction. Finally, the base station and the mobile terminal point a beam to a direction in which power of the high frequency beam is maximum in order to perform high frequency beam alignment of a high frequency antenna.

Step 406: Determine whether high frequency beams are aligned.

Step 407: Start to transmit high frequency data.

Step 408: Perform searching and high frequency beam alignment in another direction.

Step 409: Determine whether high frequency beams are aligned.

In step 406, the base station may send a synchronization sequence to the mobile terminal. The mobile terminal parses the synchronization sequence after receiving the synchronization sequence sent by the base station to determine whether high frequency beams of the base station and the mobile terminal has been aligned. If the base station and the mobile terminal are synchronized, high frequency beam alignment can be completed. If the mobile terminal obtains multiple synchronization sequences by means of parsing, high-frequency narrow beams corresponding to the multiple synchronization sequences are used as candidate high-frequency narrow beams required for alignment. The base station and the mobile terminal select an optimal high-frequency narrow beam from the candidate high-frequency narrow beams according to a priority in order to perform high frequency beam alignment of a high frequency antenna. If obtaining only one synchronization sequence by means of parsing, the base station and the mobile terminal use a high-frequency narrow beam corresponding to the synchronization sequence as a high-frequency narrow beam used for alignment to perform high frequency beam alignment of a high frequency antenna. If the base station and the mobile terminal cannot be synchronized, the high frequency beams of high frequency antennas are not aligned.

If the high frequency beams of the high frequency antennas of the base station and the mobile terminal have been aligned, step 407 is performed, that is, the base station and the mobile terminal may start to transmit high frequency data.

If the high frequency beams of the high frequency antennas of the base station and the mobile terminal are not aligned, step 408 is performed, that is, the base station and the mobile terminal perform searching and high frequency beam alignment in another direction. Afterwards, step 409 is performed, that is, it is determined again whether the high frequency beams are aligned. If the high frequency beams of the high frequency antennas of the base station and the mobile terminal have been aligned, step 407 is performed, that is, the base station and the mobile terminal start to transmit high frequency data. If the high frequency beams of the high frequency antennas of the base station and the mobile terminal are not aligned, the procedure ends.

It should be understood that in another embodiment of the present disclosure, if the base station serves multiple mobile terminals, parallel search for the multiple users and the base station may be implemented in the present disclosure. Likewise, for a high frequency beam, high frequency beam scanning, sending, and receiving may also be performed on both the base station and the mobile terminal that completes DOA estimation to perform high frequency beam alignment of a high frequency antenna and establish high frequency link synchronization.

Figure 5:
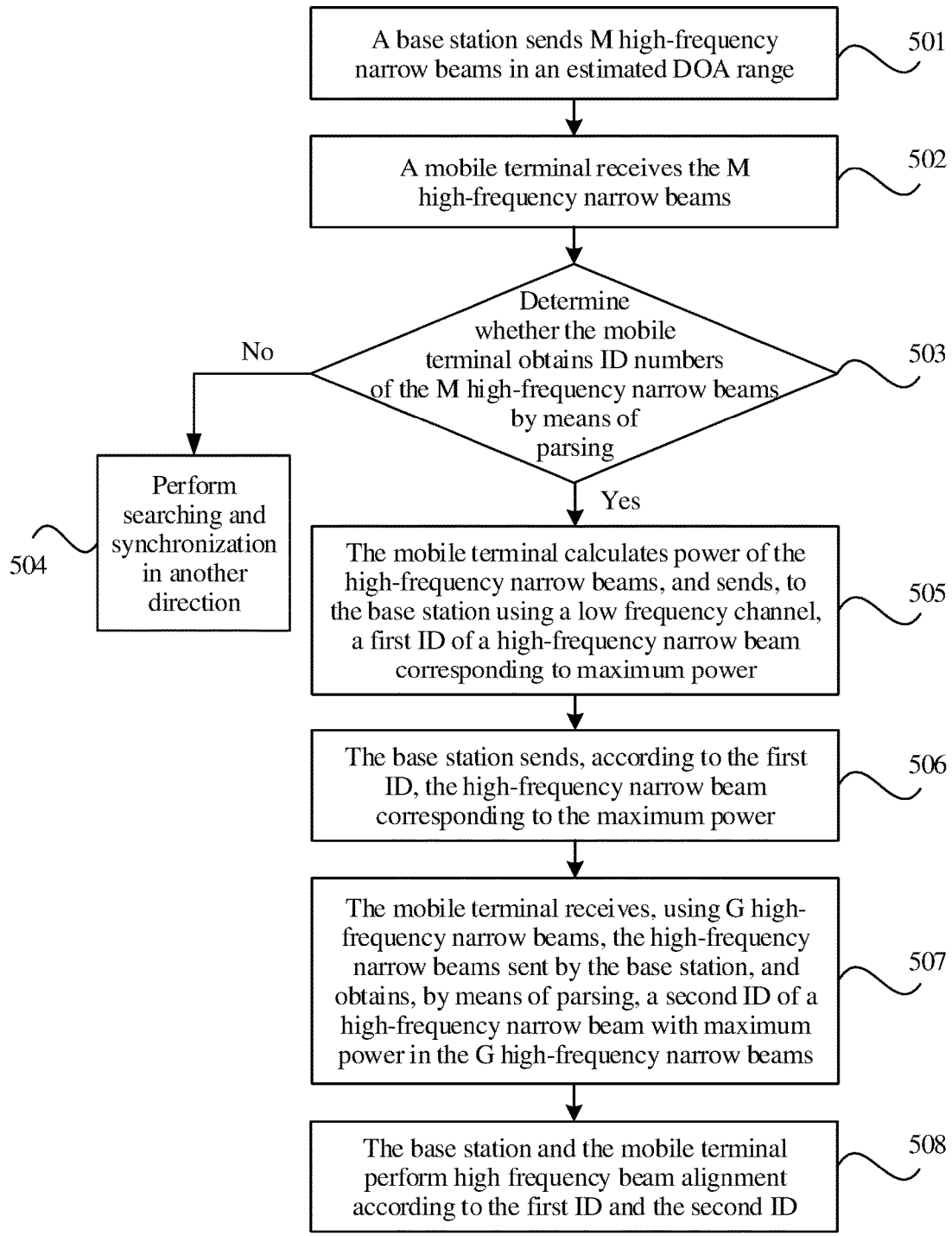
FIG. 5 is a schematic flowchart of a process of aligning antenna beams in a high-low frequency co-site network according to another embodiment of the present disclosure.

FIG. 5 is a schematic flowchart of a process of aligning antenna beams in a high-low frequency co-site network according to another embodiment of the present disclosure. The following describes the process in step 405 in which the base station and the mobile terminal perform high frequency beam alignment using the DOA information.

Step 501: The base station sends M high-frequency narrow beams in an estimated DOA range.

The base station sends the M high-frequency narrow beams at an angle in an estimated DOA range according to DOA information. In addition, each high-frequency narrow beam carries ID information used to indicate an ID of each high-frequency narrow beam.

Step 502: The mobile terminal receives the M high-frequency narrow beams.

The mobile terminal receives, using a low-frequency wide beam (a wide acceptance angle), the M high-frequency narrow beams sent by the base station. The mobile terminal may receive the high-frequency narrow beams at a sector angle, or may receive the M high-frequency narrow beams using an omnidirectional antenna.

Step 503: Determine whether the mobile terminal obtains ID numbers of the M high-frequency narrow beams by means of parsing.

Step 504: Perform searching and synchronization in another direction.

After the mobile terminal receives the high-frequency narrow beams, the mobile terminal parses the IDs of the high-frequency narrow beams, and then performs step 503. If the mobile terminal cannot obtain an ID of any high-frequency narrow beam by means of parsing, the mobile terminal performs step 504, that is, the mobile terminal resends the high-frequency narrow beams in another direction range, and performs searching and high frequency link synchronization in another direction.

Step 505: The mobile terminal calculates power of the high-frequency narrow beams, and sends, to the base station using a low frequency channel, a first ID of a high-frequency narrow beam corresponding to maximum power.

After the mobile terminal receives the high-frequency narrow beams, the mobile terminal parses the IDs of the high-frequency narrow beams, and then performs step 503. If the mobile terminal can obtain the IDs of the high-frequency narrow beams by means of parsing, the mobile terminal performs step 505, that is, the mobile terminal calculates power of all the received high-frequency narrow beams, determines an ID of a high-frequency narrow beam with maximum power, and denotes the ID as the first ID.

Step 506: The base station sends, according to the first ID, the high-frequency narrow beam corresponding to the maximum power.

The mobile terminal sends the first ID to the base station using the low frequency channel, and denotes the high-frequency narrow beam with maximum power as a first high-frequency narrow beam.

Step 507: The mobile terminal receives, using G high-frequency narrow beams, the high-frequency narrow beams sent by the base station, and obtains, by means of parsing, a second ID of a high-frequency narrow beam with maximum power in the G high-frequency narrow beams.

After receiving the first ID sent by the mobile terminal, the base station sends the first high-frequency narrow beam to the mobile terminal. The mobile terminal receives the first high-frequency narrow beam in different directions using the G high-frequency narrow beams, calculates power of the G high-frequency narrow beams to obtain the ID corresponding to the high-frequency narrow beam with maximum power in the G high-frequency narrow beams, and denotes the ID as the second ID.

Step 508: The base station and the mobile terminal perform high frequency beam alignment according to the first ID and the second ID.

The base station and the mobile terminal may perform high frequency beam alignment of a high frequency antenna according to the first ID and the second ID in order to establish high frequency link synchronization. The base station and the mobile terminal may point the high-frequency narrow beams to directions of the first ID and the second ID to perform high frequency beam alignment of a high frequency antenna. The first ID is the ID corresponding to the high-frequency narrow beam with maximum power in the M high-frequency narrow beams sent by the base station, and the second ID is the ID corresponding to the high-frequency narrow beam in the G high-frequency narrow beams of the mobile terminal, where a received signal on the high-frequency narrow beam has a maximum receive power.

It should be understood that in this embodiment of the present disclosure, an ID of a high-frequency narrow beam required for high frequency antenna alignment may be determined using power, or an ID of a required high-frequency narrow beam may be determined using an SNR or an RSL. However, the present disclosure is not limited thereto. A person skilled in the art may design a receiving statistic in another form according to a requirement, and such design falls within the scope of this embodiment of the present disclosure as long as a designed receiving statistic can indicate signal strength or signal energy.

Figure 6:
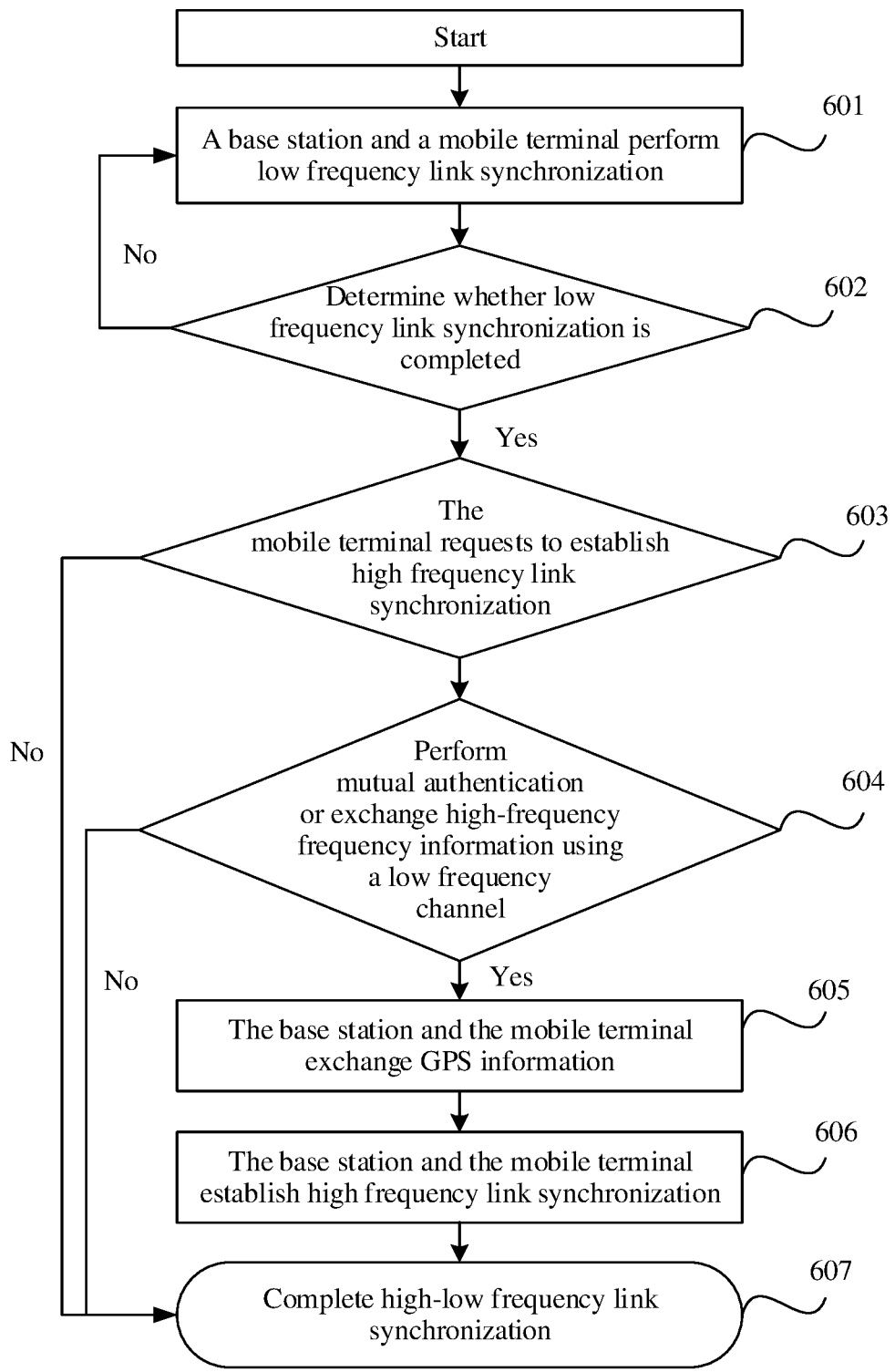
FIG. 6 is a schematic flowchart of a process of aligning antenna beams in a high-low frequency co-site network according to another embodiment of the present disclosure.

FIG. 6 is a schematic flowchart of a process of aligning antenna beams in a high-low frequency co-site network according to another embodiment of the present disclosure.

Step 601: A base station and a mobile terminal perform low frequency link synchronization.

The mobile terminal scans and receives, using a low-frequency wide beam, a low frequency beam sent by the base station. The mobile terminal scans, sends, and receives the low-frequency wide beam of the base station to search for a target cell in order to obtain downlink synchronization information of the target cell and related configuration information of the target cell. The mobile terminal that is just powered on can obtain information such as time-frequency synchronization and a cell ID of an optimal target cell only after the mobile terminal initiates a cell search command, and the mobile terminal may receive system information after completing cell search.

The mobile terminal detects a PSCH, an SSCH, a downlink reference signal, and the like in order to complete procedures such as symbol-level timing detection, radio frame clock detection, and cell ID detection. After completing the detection procedures, the mobile terminal may detect a PLMN identifier from the system information, and complete low frequency link synchronization between the base station and the mobile terminal according to the PLMN identifier in order to establish a low frequency channel.

Step 602: Determine whether low frequency link synchronization is completed.

The base station and the mobile terminal determine whether low frequency link synchronization is completed, and if low frequency link synchronization is not completed, return to step 601 to continue to perform low frequency synchronization.

Step 603: The mobile terminal requests to establish high frequency link synchronization.

The base station and the mobile terminal determine whether low frequency link synchronization is completed, and perform step 603 if low frequency link synchronization is completed. The mobile terminal determines, according to a data traffic requirement, whether to establish high frequency link synchronization, and performs step 607 if there is no need to establish high frequency link synchronization.

Step 604: Perform mutual authentication or exchange high-frequency frequency information using a low frequency channel.

If there is a need to establish high frequency link synchronization, step 604 is performed. The base station and the mobile terminal determine whether to perform mutual authentication or to confirm high-frequency frequency information of the two parties. If there is no need to establish high frequency link synchronization, step 607 is performed. If there is a need to establish high frequency link synchronization, the base station and the mobile terminal perform mutual authentication or confirm the high-frequency frequency information of the two parties, and then perform step 605.

Optionally, if the mobile terminal determines to establish high frequency link synchronization, the base station may pre-determine an access right of the mobile terminal. Likewise, the mobile terminal may also pre-determine an access right of the base station in order to avoid an unnecessary high frequency antenna connection.

Optionally, the mobile terminal and the base station may exchange the high-frequency frequency information of the two parties using the low frequency channel. In this way, complexity of high frequency beam alignment can be reduced, and high frequency beam alignment of a high frequency antenna can be further quickly implemented.

Step 605: The base station and the mobile terminal exchange GPS information.

The base station and the mobile terminal start to establish high frequency link synchronization. In order to narrow a search range, shorten a high frequency beam alignment time of a high frequency antenna, and quickly complete high frequency link synchronization, the base station and the mobile terminal may exchange the GPS information before establishing high frequency link synchronization. For example, the mobile terminal may determine location information of the mobile terminal using a GPS, and send the location information to the base station. Likewise, the base station may also determine location information of the base station using the GPS, and send the location information to the mobile terminal.

Step 606: The base station and the mobile terminal establish high frequency link synchronization.

The base station and the mobile terminal exchange related information of high frequency beam alignment using the low frequency channel in order to determine a high frequency beam direction for high frequency antenna alignment in order to establish high frequency link synchronization.

Step 607: Complete high-low frequency link synchronization.

The base station and the mobile terminal perform step 607 after establishing high frequency link synchronization, that is, the base station and the mobile terminal complete high-low frequency link synchronization, and may transmit high-low frequency data.

Figure 7:
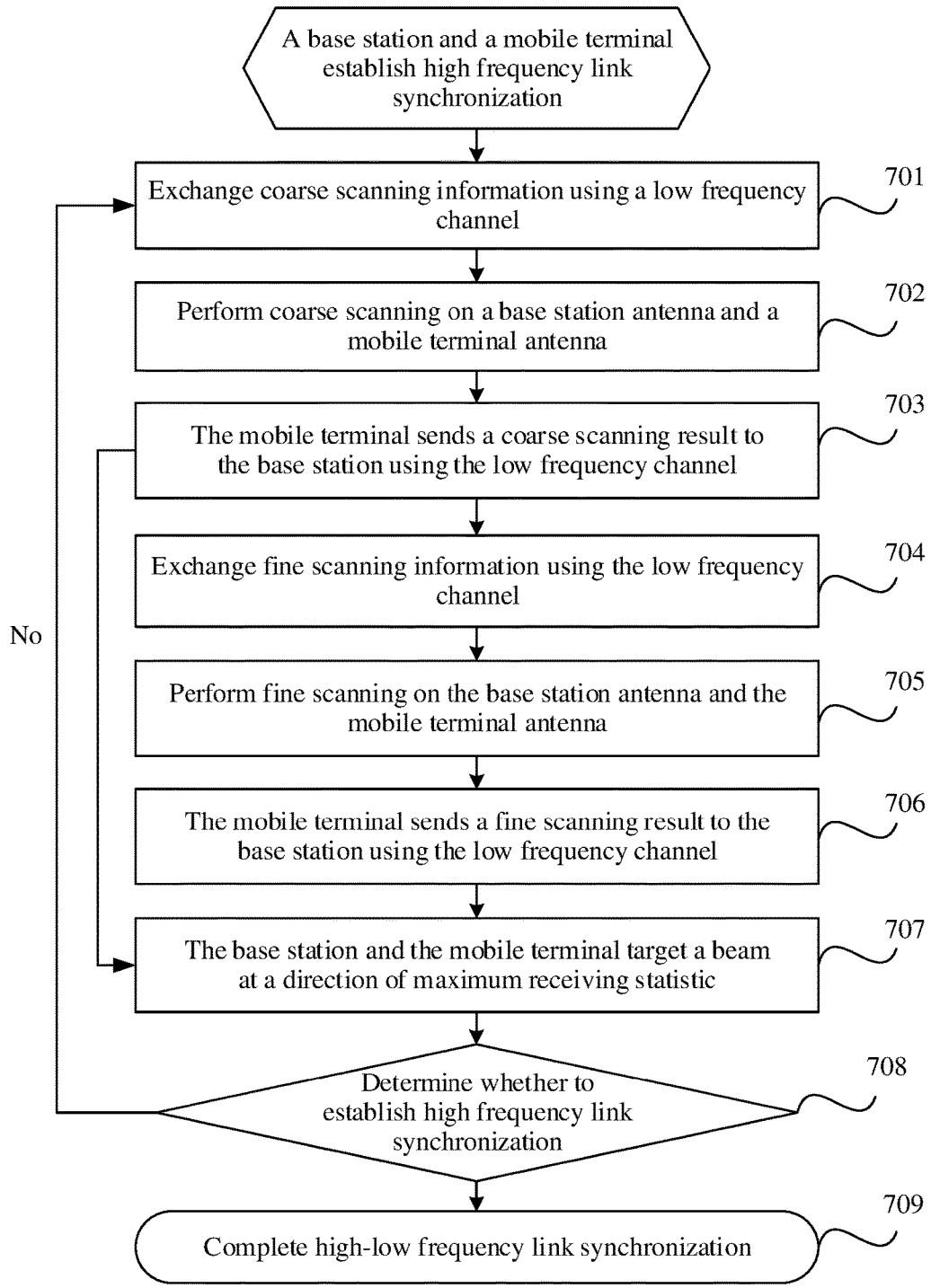
FIG. 7 is a schematic flowchart of a process of aligning antenna beams in a high-low frequency co-site network according to another embodiment of the present disclosure.

FIG. 7 is a schematic flowchart of a process of aligning antenna beams in a high-low frequency co-site network according to another embodiment of the present disclosure. The following describes the process in step 606 in which the base station and the mobile terminal establish high frequency link synchronization.

Step 701: Exchange coarse scanning information using a low frequency channel.

A base station may agree on a scanning start time using the low frequency channel. The base station may further send or receive first scanning information using the low frequency channel in order to perform coarse scanning. The first scanning information is used to indicate a scanning sector division manner or a quantity of scanning sectors of the base station and a scanning sector division manner or a quantity of scanning sectors of a mobile device. For example, the quantity of scanning sectors of the mobile terminal is N, and the quantity of scanning sectors of the base station is Q, N is a positive integer, and Q is a positive integer. The Q scanning sectors of the base station are separately denoted as $B_1$, $B_2$, $B_3$, ..., and $B_Q$, and the N scanning sectors of the mobile terminal are separately denoted as $U_1$, $U_2$, $U_3$, ..., and $U_N$.

Step 702: Perform coarse scanning on a base station antenna and a mobile terminal antenna.

The base station first sends a high-frequency narrow beam of the region $B_1$ to the mobile terminal in the region $B_1$ according to the first scanning information, and the sending step lasts for a period of time $T_1$. The mobile terminal successively receives, within $T_1$, the high-frequency narrow beam of the region $B_1$ regions $U_1$, $U_2$, $U_3$, ..., and $U_N$. Afterwards, the base station sends a high-frequency narrow beam of the region $B_2$ to the mobile terminal in the region $B_2$, and the mobile terminal separately and successively receives, within $T_1$, the high-frequency narrow beam of the region $B_2$ in the regions $U_1$, $U_2$, $U_3$, ..., and $U_N$. In such a sequence, the base station successively sends high-frequency narrow beams to the mobile terminal in total Q regions $B_1$, $B_2$, $B_3$, ..., and $B_Q$. The mobile terminal receives, using Q×N high-frequency narrow beams in total, the Q high-frequency narrow beams sent by the base station, determines Q×N receiving statistics of received signals on the Q×N high-frequency narrow beams that are in a one-to-one correspondence with the Q scanning sectors and the N scanning sectors 1, and records the Q×N receiving statistics in a Q×N matrix.

Step 703: The mobile terminal sends a coarse scanning result to the base station using the low frequency channel.

The mobile terminal sends a first serial number q of the first scanning sector and a second serial number n of the second scanning sector to the base station, where the first serial number q and the second serial number n correspond to a maximum receiving statistic in the Q×N receiving statistics. The base station and the mobile terminal may perform step 707 after the coarse scanning, that is, point a transmit beam and a receive beam to a direction of the maximum receiving statistic according to q and n in order to perform high frequency beam alignment of a high frequency antenna. The base station and the mobile terminal may perform step 704 after the coarse scanning, that is, exchange fine scanning information, and continue to narrow a scanning range.

Step 704: Exchange fine scanning information using the low frequency channel.

The base station and the mobile terminal exchange, using the low frequency channel, information indicating that fine scanning continues to be performed, and agree on second scanning information, for example, agree on a scanning sub-sector division manner or a quantity of scanning sub-sectors of a scanning sector corresponding to the first serial number and a scanning sub-sector division manner or a quantity of scanning sub-sectors of a scanning sector corresponding to the second serial number. It is assumed that the quantity of scanning sub-sectors of the scanning sector corresponding to the first serial number is H, and the quantity of scanning sub-sectors of the scanning sector corresponding to the second serial number is P. The H scanning sub-sectors are separately denoted as $B_{q1}$, $B_{q2}$, $B_{q3}$, ..., and $B_{qH}$, and the P scanning sub-sectors are separately denoted as $U_{n1}$, $U_{n2}$, $U_{n3}$, ..., and $U_{nP}$.

Step 705: Perform fine scanning on the base station antenna and the mobile terminal antenna.

The base station first sends a high-frequency narrow beam of the region $B_{q1}$ to the mobile terminal in the region $B_{q1}$ according to the second scanning information, and the sending step lasts for $T_2$. The mobile terminal separately receives, within $T_2$ in the regions $U_{n1}$, $U_{n2}$, $U_{n3}$, ..., and $U_{nP}$ using P high-frequency narrow beams, the high-frequency narrow beam sent by the base station in the region $B_{q1}$. Afterwards, the base station sends a high-frequency narrow beam of the region $B_{q2}$ to the mobile terminal in the region $B_{q2}$. The mobile terminal separately receives, within $T_2$ in the regions $U_{n1}$, $U_{n2}$, $U_{n3}$, ..., and $U_{nP}$ using P high-frequency narrow beams, the high-frequency narrow beam sent by the base station in the region $B_{q2}$. In such a sequence, the base station finally sends a high-frequency narrow beam of the region $B_{qH}$ to the mobile terminal in the region $B_{qH}$. The mobile terminal separately receives, within $T_2$ in the regions $U_{n1}$, $U_{n2}$, $U_{n3}$, ..., and $U_{nP}$ using P high-frequency narrow beams, the high-frequency narrow beam sent by the base station in the region $B_{qH}$. The mobile terminal receives, using H×P high-frequency narrow beams in total, H high-frequency narrow beams sent by the base station in the H scanning sectors. After receiving the high-frequency narrow beams sent by the base station, the mobile terminal determines H×P receiving statistics of received signals on the H×P high-frequency narrow beams that are in a one-to-one correspondence with a third scanning sector and a fourth scanning sector, and records the H×P receiving statistics in an H×P matrix.

Step 706: The mobile terminal sends a fine scanning result to the base station using the low frequency channel.

The mobile terminal sends a third serial number of the third scanning sector and a fourth serial number of the fourth scanning sector to the base station, where the third serial number and the fourth serial number correspond to a maximum receiving statistic in the H×P receiving statistics.

Step 707: The base station and the mobile terminal target a beam at a direction of a maximum receiving statistic.

The base station and the mobile terminal point the transmit beam and the receive beam to the direction of the maximum receiving statistic according to the third serial number and the fourth serial number in order to perform high frequency beam alignment of a high frequency antenna.

Step 708: Determine whether to establish high frequency link synchronization.

Step 709: Complete high-low frequency link synchronization.

After step 707, the base station and the mobile terminal determine whether to establish high frequency link synchronization. If high frequency link synchronization is not established, return to step 701, that is, the base station and the mobile terminal re-exchange coarse scanning information to perform coarse scanning. If high frequency link synchronization is established, step 709 is performed, that is, the base station and the mobile terminal complete high-low frequency link synchronization, and may transmit high-low frequency data.

Figure 8:
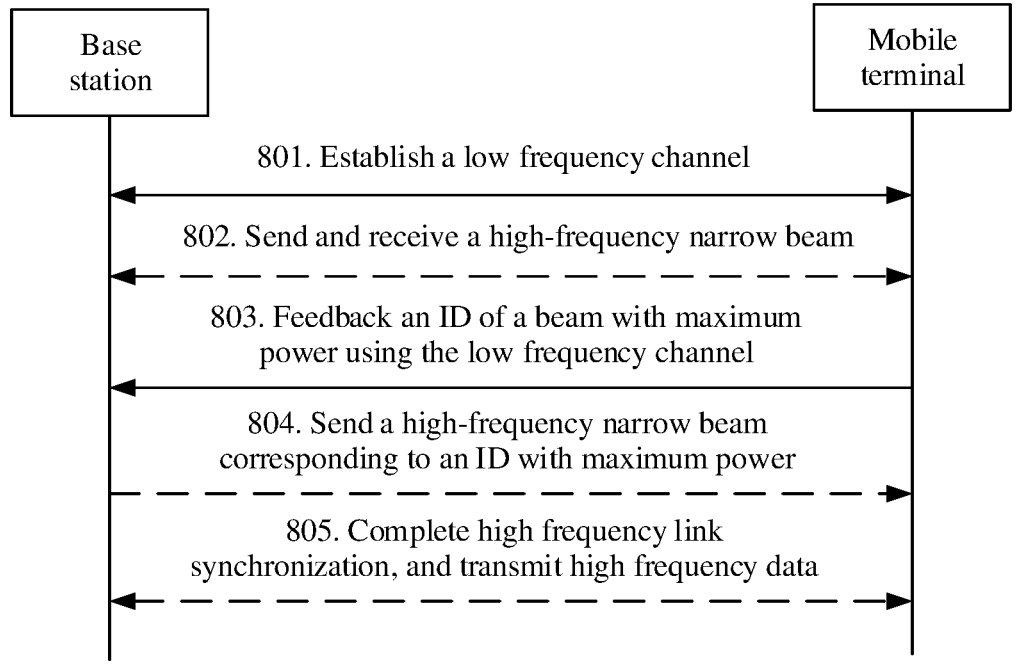
FIG. 8 is a signaling flowchart of aligning antenna beams in a high-low frequency co-site network according to an embodiment of the present disclosure.

FIG. 8 is a signaling flowchart of aligning antenna beams in a high-low frequency co-site network according to an embodiment of the present disclosure. In FIG. 8, a solid line indicates that a low frequency beam is used for communication, and a dashed line indicates that a high frequency beam is used for communication.

Step 801: Establish a low frequency channel.

A base station and a mobile terminal complete low frequency link synchronization to establish the low frequency channel, and may transmit low frequency data. Step 801 may correspond to step 401 to step 403 in the embodiment in FIG. 4.

Step 802: Send and receive a high-frequency narrow beam.

The base station estimates a DOA using the low frequency channel, and sends a high-frequency narrow beam to the mobile terminal in a DOA estimation range. The mobile terminal receives the high-frequency narrow beam, and parses an ID of the high-frequency narrow beam. Step 802 may correspond to step 501 and step 502 in the embodiment in FIG. 5.

Step 803: Feedback an ID of a beam with maximum power using the low frequency channel.

The mobile terminal sends, to the base station using the low frequency channel, a first ID corresponding to a high-frequency narrow beam with maximum power. Step 803 may correspond to step 503 to step 505 in the embodiment in FIG. 5.

Step 804: Send a high-frequency narrow beam corresponding to an ID with maximum power.

The base station sends the high-frequency narrow beam with maximum power to the mobile terminal according to the received ID corresponding to the high-frequency narrow beam with maximum power. The mobile terminal receives the high-frequency narrow beam, and parses an ID in order to obtain a second ID corresponding to the high-frequency narrow beam with maximum power. Step 804 may correspond to step 506 in the embodiment in FIG. 5.

Step 805: Complete high frequency link synchronization, and transmit high frequency data.

The base station and the mobile terminal implement high frequency beam alignment of a high frequency antenna, complete high frequency link synchronization, and may transmit high frequency data. Step 805 may correspond to step 507 to step 508 in the embodiment in FIG. 5.

Figure 9:
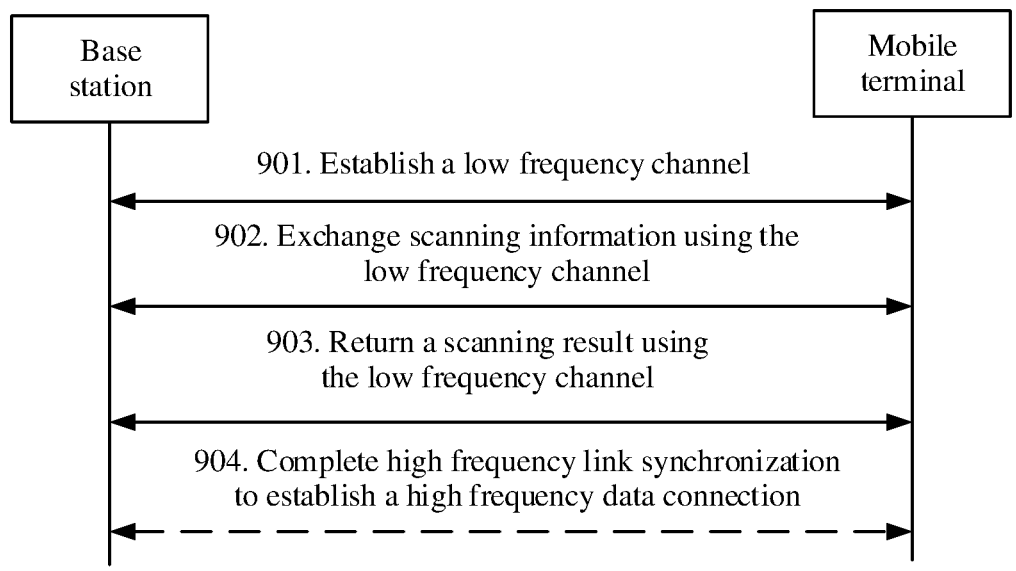
FIG. 9 is a signaling flowchart of aligning antenna beams in a high-low frequency co-site network according to another embodiment of the present disclosure.

FIG. 9 is a signaling flowchart of aligning antenna beams in a high-low frequency co-site network according to another embodiment of the present disclosure. In FIG. 9, a solid line indicates that a low frequency beam is used for communication, and a dashed line indicates that a high frequency beam is used for communication.

Step 901: Establish a low frequency channel.

A base station and a mobile terminal complete low frequency link synchronization to establish the low frequency channel, and may transmit low frequency data. Step 901 may correspond to step 601 and step 602 in the embodiment in FIG. 6.

Step 902: Exchange scanning information using the low frequency channel.

The base station and the mobile terminal may exchange scanning information using the low frequency channel, to perform scanning. The scanning information herein includes coarse scanning information and fine scanning information. Step 907 may correspond to step 701 and step 704 in the embodiment in FIG. 7.

Step 903: Return a scanning result using the low frequency channel.

The base station and the mobile terminal may return the scanning result using the low frequency channel, obtain a beam direction required by the base station and the mobile terminal to perform high frequency beam alignment of a high frequency antenna, and target a beam at a direction of maximum power. Step 903 may correspond to step 703 and step 706 in the embodiment in FIG. 7.

Step 904: Complete high frequency link synchronization to establish a high frequency data connection.

The base station and the mobile terminal implement high frequency beam alignment of a high frequency antenna, complete high frequency link synchronization, and may transmit high frequency data. Step 904 may correspond to step 707 to step 709 in the embodiment in FIG. 7.

A method, a process, and signaling interaction for aligning antenna beams in a high-low frequency co-site network according to embodiments of the present disclosure are described above in detail with reference to FIG. 2 to FIG. 9 respectively from perspectives of a base station, a mobile terminal, and interaction between the two. The following describes a base station and a mobile terminal for aligning antenna beams in a high-low frequency co-site network according to the embodiments of the present disclosure with reference to FIG. 10 to FIG. 13 respectively from perspectives of a base station and a mobile terminal.

Figure 10:
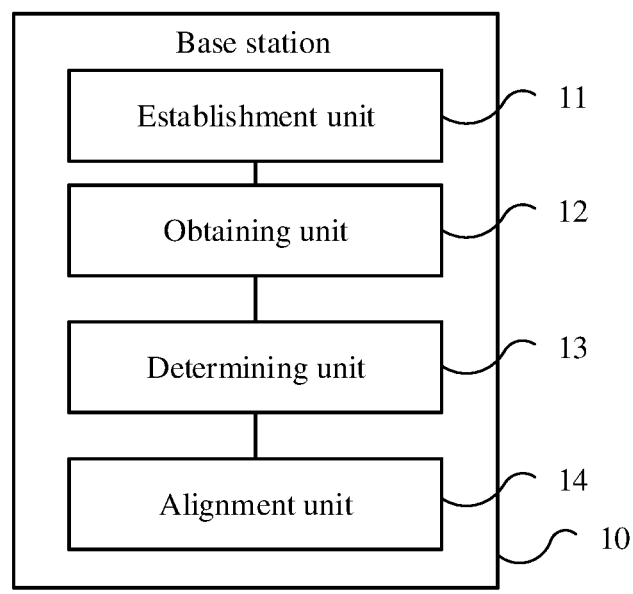
FIG. 10 is a block diagram of a base station for aligning antenna beams in a high-low frequency co-site network according to an embodiment of the present disclosure.

FIG. 10 is a block diagram of a base station for aligning antenna beams in a high-low frequency co-site network according to an embodiment of the present disclosure. The base station 10 in FIG. 10 is, for example, similar to the base station 101 in FIG. 1, and includes an establishment unit 11, an obtaining unit 12, a determining unit 13, and an alignment unit 14.

The establishment unit 11 is configured to establish a low frequency channel with a low frequency antenna of a communications device.

The obtaining unit 12 is configured to obtain location information of the communications device using the low frequency channel established by the establishment unit 11.

The determining unit 13 is configured to determine a scanning range of a high frequency beam according to the location information of the communications device that is obtained by the obtaining unit 12.

The alignment unit 14 is configured to perform high frequency beam alignment of a high frequency antenna with the communications device according to the scanning range that is of the high frequency beam and is determined by the determining unit 13.

In this embodiment of the present disclosure, when performing antenna beam alignment in a high-low frequency co-site network, a base station and a mobile terminal first establish a low frequency channel, and then perform high frequency beam alignment of a high frequency antenna using the low frequency channel. In this way, a technical problem that a high frequency beam alignment time of a high frequency antenna is long due to a narrow field of view of a high frequency beam can be avoided such that high frequency beam alignment of a high frequency antenna can be quickly implemented.

The base station 10 in this embodiment of the present disclosure may implement operations or functions related to the base station in the embodiments in FIG. 2, and FIG. 4 to FIG. 9. In order to avoid repetition, details are not described herein again.

Optionally, in another embodiment, the obtaining unit 12 is further configured to receive, using the low frequency channel, the location information of the communications device that is determined using a GPS and is sent by the communications device.

Optionally, in another embodiment, the obtaining unit 12 is further configured to estimate a DOA of a low frequency beam using the low frequency channel, to obtain DOA information of the low frequency beam, and determine the location information of the communications device according to the DOA information of the low frequency beam.

Optionally, in another embodiment, the alignment unit 14 is further configured to send M high-frequency narrow beams to the communications device according to the scanning range of the high frequency beam, where each high-frequency narrow beam carries ID information used to indicate an ID of each high-frequency narrow beam, receive a first ID, of a first high-frequency narrow beam, that corresponds to a first maximum receiving statistic and is sent by the communications device, where the first maximum receiving statistic is a maximum value in M receiving statistics of received signals on the M high-frequency narrow beams received by the communications device, and the first high-frequency narrow beam is one of the M high-frequency narrow beams, send the first high-frequency narrow beam to the communications device, and perform high frequency beam alignment of a high frequency antenna with the communications device according to the first ID.

Optionally, in another embodiment, the base station 10 is an access device of the communications device, and the alignment unit 14 is further configured to send, using the low frequency channel, first scanning information to the communications device, or receive first scanning information sent by the communications device, where the first scanning information is used to indicate a scanning sector division manner or a quantity of scanning sectors of the communications device and a scanning sector division manner or a quantity of scanning sectors of the access device, and perform high frequency beam alignment of a high frequency antenna according to the first scanning information.

Optionally, in another embodiment, the alignment unit 14 sends a high-frequency narrow beam to the communications device in a first scanning sector such that the communications device receives the high-frequency narrow beam in a second scanning sector, where the first scanning sector is any one of Q scanning sectors, and the second scanning sector is any one of N scanning sectors, receives a first serial number of the first scanning sector and a second serial number of the second scanning sector, where the first serial number and the second serial number correspond to a second maximum receiving statistic and are sent by the communications device, and the second maximum receiving statistic is a maximum value in Q×N receiving statistics of received signals on Q×N high-frequency narrow beams determined by the communications device, and performs high frequency beam alignment of a high frequency antenna with the communications device according to the first serial number and the second serial number, where the quantity of scanning sectors of the communications device is N, the quantity of scanning sectors of the access device is Q, N is a positive integer, and Q is a positive integer.

Optionally, in another embodiment, the alignment unit 14 is further configured to using the low frequency channel, send second scanning information to the communications device, or receive second scanning information sent by the communications device, where the second scanning information is used to indicate a scanning sub-sector division manner or a quantity of scanning sub-sectors of a scanning sector corresponding to the first serial number and a scanning sub-sector division manner or a quantity of scanning sub-sectors of a scanning sector corresponding to the second serial number, the quantity of scanning sub-sectors of the scanning sector corresponding to the first serial number is H, the quantity of scanning sub-sectors of the scanning sector corresponding to the second serial number is P, H is a positive integer, and P is a positive integer, send a high-frequency narrow beam to the communications device in a scanning sub-sector of the scanning sector corresponding to the first serial number such that the communications device receives the high-frequency narrow beam in a scanning sub-sector of the scanning sector corresponding to the second serial number, where the third scanning sector is any one of the H scanning sub-sectors, and the fourth scanning sector is any one of the P scanning sub-sectors, receive a third serial number of the third scanning sector and a fourth serial number of the fourth scanning sector, where the third serial number and the fourth serial number correspond to a third maximum receiving statistic and are sent by the communications device, and the third maximum receiving statistic is a maximum value in H×P receiving statistics of received signals on H×P high-frequency narrow beams received by the communications device, and perform high frequency beam alignment of a high frequency antenna with the communications device according to the third serial number and the fourth serial number.

Optionally, in another embodiment, the receiving statistic includes at least one of the following parameters power, an SNR, or an RSL.

Optionally, in another embodiment, the base station 10 is further configured to perform mutual authentication with the communications device using the low frequency channel, or send high-frequency frequency information to the communications device.

Optionally, in another embodiment, the alignment unit 14 is further configured to send, using the low frequency channel, a scanning start time to the communications device, or receive a scanning start time sent by the communications device, and start, at the scanning start time, to perform high frequency beam alignment of a high frequency antenna with the communications device according to the scanning range of the high frequency beam.

Figure 11:
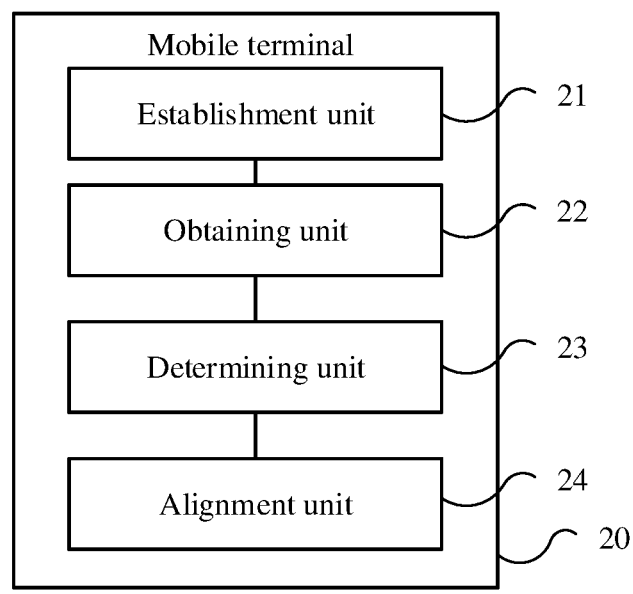
FIG. 11 is a block diagram of a mobile terminal for aligning antenna beams in a high-low frequency co-site network according to another embodiment of the present disclosure.

FIG. 11 is a block diagram of a mobile terminal 20 for aligning antenna beams in a high-low frequency co-site network according to another embodiment of the present disclosure. The mobile terminal 20 in FIG. 11 is, for example, the mobile terminal 103 in FIG. 1, and includes an establishment unit 21, an obtaining unit 22, a determining unit 23, and an alignment unit 24.

The establishment unit 21 is configured to establish a low frequency channel with a low frequency antenna of a communications device.

The obtaining unit 22 is configured to obtain location information of the communications device using the low frequency channel established by the establishment unit 21.

The determining unit 23 is configured to determine a scanning range of a high frequency beam according to the location information of the communications device that is obtained by the obtaining unit 22.

The alignment unit 24 is configured to perform high frequency beam alignment of a high frequency antenna with the communications device according to the scanning range that is of the high frequency beam and is determined by the determining unit 23.

In this embodiment of the present disclosure, when performing antenna beam alignment in a high-low frequency co-site network, a base station and a mobile terminal first establish a low frequency channel, and then perform high frequency beam alignment of a high frequency antenna using the low frequency channel. In this way, a technical problem that a high frequency beam alignment time of a high frequency antenna is long due to a narrow field of view of a high frequency beam can be avoided such that high frequency beam alignment of a high frequency antenna can be quickly implemented.

The mobile terminal 20 in this embodiment of the present disclosure may implement operations or functions related to the mobile terminal in the embodiments in FIG. 3 to FIG. 9. In order to avoid repetition, details are not described herein again.

Optionally, in another embodiment, the obtaining unit 22 is further configured to receive, using the low frequency channel, the location information of the communications device that is determined using a GPS and is sent by the communications device.

Optionally, in another embodiment, the alignment unit 24 is further configured to receive, in the scanning range of the high frequency beam, M high-frequency narrow beams sent by the communications device, where each high-frequency narrow beam carries ID information used to indicate an ID of each high-frequency narrow beam, determine M receiving statistics that are of received signals on the high-frequency narrow beams and correspond to the M high-frequency narrow beams, send, to the communications device, a first ID that is of a first high-frequency narrow beam and corresponds to a first maximum receiving statistic, where the first maximum receiving statistic is a maximum value in the M receiving statistics of received signals on the received M high-frequency narrow beams, and the first high-frequency narrow beam is one of the M high-frequency narrow beams, receive, using G high-frequency narrow beams, the first high-frequency narrow beam sent by the communications device, determine a second ID corresponding to a high-frequency narrow beam with a maximum receiving statistic in the G high-frequency narrow beams, and perform high frequency beam alignment of a high frequency antenna with the communications device according to the first ID and the second ID.

Optionally, in another embodiment, the mobile terminal 20 is an access device of the communications device, and the alignment unit 24 is further configured to send, using the low frequency channel, first scanning information to the communications device, or receive first scanning information sent by the communications device, where the first scanning information is used to indicate a scanning sector division manner or a quantity of scanning sectors of the communications device and a scanning sector division manner or a quantity of scanning sectors of the access device, and perform high frequency beam alignment of a high frequency antenna according to the scanning range of the high frequency beam and the first scanning information.

Optionally, in another embodiment, the alignment unit 24 is further configured to receive, by the access device in a second scanning sector, a high-frequency narrow beam sent by the communications device in a first scanning sector, where the first scanning sector is any one of Q scanning sectors, and the second scanning sector is any one of N scanning sectors, determine receiving statistics of received signals on Q×N high-frequency narrow beams that are in a one-to-one correspondence with the Q scanning sectors and the N scanning sectors, to obtain Q×N receiving statistics, send a first serial number of the first scanning sector and a second serial number of the second scanning sector to the communications device, where the first serial number and the second serial number correspond to a second maximum receiving statistic, and the second maximum receiving statistic is a maximum value in the Q×N receiving statistics of received signals on the Q×N high-frequency narrow beams, and perform high frequency beam alignment of a high frequency antenna with the communications device according to the first serial number and the second serial number, where the quantity of scanning sectors of the communications device is Q, the quantity of scanning sectors of the access device is N, Q is a positive integer, and N is a positive integer.

Optionally, in another embodiment, the alignment unit 24 is further configured to send, using the low frequency channel, second scanning information to the communications device, or receive second scanning information sent by the communications device, where the second scanning information is used to indicate a scanning sub-sector division manner or a quantity of scanning sub-sectors of a scanning sector corresponding to the first serial number and a scanning sub-sector division manner or a quantity of scanning sub-sectors of a scanning sector corresponding to the second serial number, the quantity of scanning sub-sectors of the scanning sector corresponding to the first serial number is H, the quantity of scanning sub-sectors of the scanning sector corresponding to the second serial number is P, H is a positive integer, and P is a positive integer, determine receiving statistics of received signals on H×P high-frequency narrow beams that are in a one-to-one correspondence with the H scanning sectors and the P scanning sectors, to obtain H×P receiving statistics, send a third serial number of a third scanning sector and a fourth serial number of the fourth scanning sector to the communications device, where the third serial number and the fourth serial number correspond to a third maximum receiving statistic, and the third maximum receiving statistic is a maximum value in the H×P receiving statistics of received signals on H×P high-frequency narrow beams, and perform high frequency beam alignment of a high frequency antenna with the communications device according to the third serial number and the fourth serial number.

Optionally, in another embodiment, the receiving statistic includes at least one of the following parameters power, an SNR, or an RSL.

Optionally, in another embodiment, the mobile terminal 20 is further configured to perform mutual authentication with the communications device using the low frequency channel, or send high-frequency frequency information to the communications device using the low frequency channel.

Optionally, in another embodiment, the alignment unit 24 is further configured to send, using the low frequency channel, a scanning start time to the communications device, or receive a scanning start time sent by the communications device, and start, at the scanning start time in order to perform high frequency beam alignment of a high frequency antenna with the communications device according to the scanning range of the high frequency beam.

Figure 12:
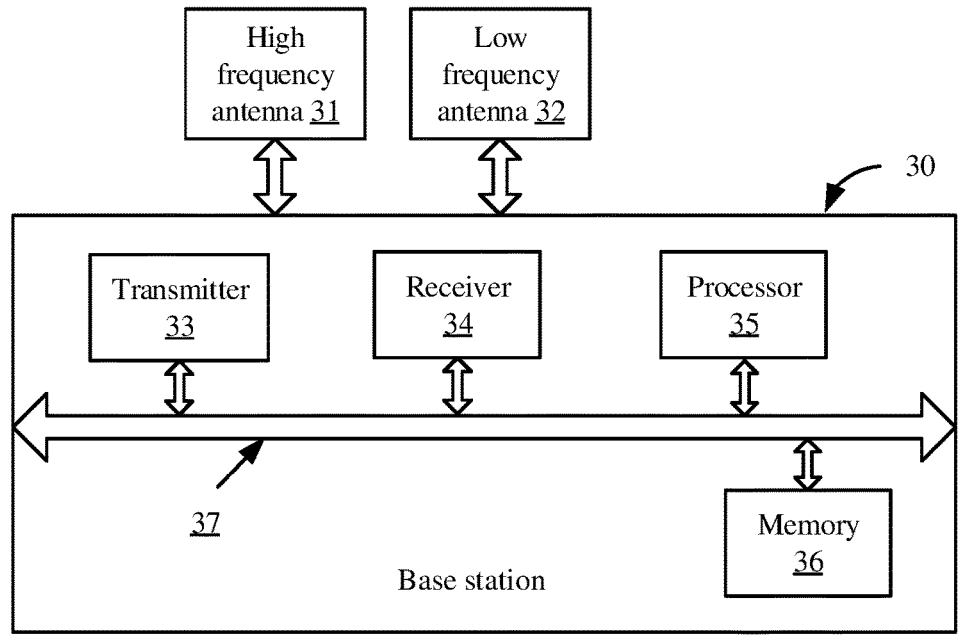
FIG. 12 is a block diagram of a base station for aligning antenna beams in a high-low frequency co-site network according to another embodiment of the present disclosure.

FIG. 12 is a block diagram of a base station 30 for aligning antenna beams in a high-low frequency co-site network according to another embodiment of the present disclosure.

The base station 30 in FIG. 12 may be configured to implement steps and methods in the foregoing method embodiments. In the embodiment in FIG. 12, the base station 30 includes a high frequency antenna 31, a low frequency antenna 32, a transmitter 33, a receiver 34, a processor 35, and a memory 36. The processor 35 controls an operation of the base station 30, and may be configured to process a signal. The memory 36 may include a read-only memory (ROM) and a random access memory (RAM), and provide an instruction and data for the processor 35. A part of the memory 36 may further include a nonvolatile RAM (NVRAM). The transmitter 33 and the receiver 34 may be coupled to the high frequency antenna 31 and the low frequency antenna 32. Components of the base station 30 are coupled together using a bus system 37. In addition to a data bus, the bus system 37 further includes a power bus, a control bus, and a status signal bus. However, for clarity of description, various buses are marked as the bus system 37 in FIG. 12.

The methods disclosed in the foregoing embodiments of the present disclosure may be applied to the processor 35, or be implemented by the processor 35. In an implementation process, steps in the foregoing methods may be completed using an integrated logic circuit of hardware in the processor 35 or an instruction in a software form. The processor 35 may be a general purpose processor, a digital signal processor, an application-specific integrated circuit, a field programmable gate array or another programmable logic device, a discrete gate or a transistor logic device, or a discrete hardware component, and may implement or execute methods, steps, and logic block diagrams that are disclosed in the embodiments of the present disclosure. The general purpose processor may be a microprocessor, any conventional processor, or the like. Steps of the methods disclosed with reference to the embodiments of the present disclosure may be directly executed and completely using a hardware processor, or may be executed and completely using a combination of hardware and software modules in the processor 35. The software module may be located in a mature storage medium in the art, such as a RAM, a flash memory, a ROM, a programmable read-only memory (PROM), an electrically erasable programmable memory, or a register. The storage medium is located in the memory 36. The processor 35 reads information in the memory 36, and completes the steps of the foregoing methods with reference to the hardware of the processor 35.

The processor 35 may be configured to establish a low frequency channel with a low frequency antenna of a communications device, and obtain location information of the communications device using the low frequency channel. The processor 35 is further configured to determine a scanning range of a high frequency beam according to the location information of the communications device, and perform high frequency beam alignment of a high frequency antenna with the communications device according to the scanning range of the high frequency beam.

In this embodiment of the present disclosure, when performing antenna beam alignment in a high-low frequency co-site network, a base station and a mobile terminal first establish a low frequency channel, and then perform high frequency beam alignment of a high frequency antenna using the low frequency channel. In this way, a technical problem that a high frequency beam alignment time is long due to a narrow field of view of a high frequency beam can be avoided such that high frequency beam alignment of a high frequency antenna can be quickly implemented.

In specific application, the communications device may be built in or may be a wireless communications device such as a mobile phone, and may further include a carrier that accommodates a transmit circuit and a receive circuit in order to allow data transmission and receiving between the communications device and a remote location. The transmit circuit and the receive circuit may be coupled to an antenna. Components of the communications device are coupled together using a bus (also referred to as a bus system). The communications device may further include a processing unit for signal processing, and further includes a power controller and a decoding processor. Further, decoders in different products may be integrated with the processing unit.

The base station 30 can implement operations related to the base station in the foregoing method embodiments. In order to avoid repetition, details are not described herein again.

Optionally, in an embodiment, the receiver 34 may receive, using the low frequency channel, the location information of the communications device that is determined using a GPS and is sent by the communications device.

Optionally, in another embodiment, the processor 35 may estimate a DOA of a low frequency beam using the low frequency channel, to obtain DOA information of the low frequency beam, and determine the location information of the communications device according to the DOA information of the low frequency beam.

Optionally, in another embodiment, the transmitter 33 may send M high-frequency narrow beams to the communications device according to the scanning range of the high frequency beam, where each high-frequency narrow beam carries ID information used to indicate an ID of each high-frequency narrow beam. The receiver 34 may receive a first ID, of a first high-frequency narrow beam, that corresponds to a first maximum receiving statistic and is sent by the communications device, where the first maximum receiving statistic is a maximum value in M receiving statistics of received signals on the M high-frequency narrow beams received by the communications device, and the first high-frequency narrow beam is one of the M high-frequency narrow beams. The transmitter 33 may send the first high-frequency narrow beam to the communications device. The processor 35 may perform high frequency beam alignment of a high frequency antenna with the communications device according to the first ID.

Optionally, in another embodiment, the base station 30 is an access device of the communications device. The transmitter 33 sends first scanning information to the communications device using the low frequency channel, or the receiver 34 receives, using the low frequency channel, first scanning information sent by the communications device, where the first scanning information is used to indicate a scanning sector division manner or a quantity of scanning sectors of the communications device and a scanning sector division manner or a quantity of scanning sectors of the access device. The processor 35 performs high frequency beam alignment of a high frequency antenna with the communications device according to the scanning range of the high frequency beam and the first scanning information.

Optionally, in another embodiment, the transmitter 33 sends a high-frequency narrow beam to the communications device in a first scanning sector such that the communications device receives the high-frequency narrow beam in a second scanning sector, where the first scanning sector is any one of Q scanning sectors, and the second scanning sector is any one of N scanning sectors. The receiver 34 receives a first serial number of the first scanning sector and a second serial number of the second scanning sector, where the first serial number and the second serial number correspond to a second maximum receiving statistic and are sent by the communications device, and the second maximum receiving statistic is a maximum value in Q×N receiving statistics of received signals on Q×N high-frequency narrow beams determined by the communications device. The processor 35 performs high frequency beam alignment of a high frequency antenna with the communications device according to the first serial number and the second serial number, where the quantity of scanning sectors of the communications device is N, the quantity of scanning sectors of the access device is Q, N is a positive integer, and Q is a positive integer.

Optionally, in another embodiment, the transmitter 33 sends second scanning information to the communications device using the low frequency channel, or the receiver 34 receives second scanning information sent by the communications device, where the second scanning information is used to indicate a scanning sub-sector division manner or a quantity of scanning sub-sectors of a scanning sector corresponding to the first serial number and a scanning sub-sector division manner or a quantity of scanning sub-sectors of a scanning sector corresponding to the second serial number, the quantity of scanning sub-sectors of the scanning sector corresponding to the first serial number is H, the quantity of scanning sub-sectors of the scanning sector corresponding to the second serial number is P, H is a positive integer, and P is a positive integer. The transmitter 33 sends a high-frequency narrow beam to the communications device in a scanning sub-sector of the scanning sector corresponding to the first serial number such that the communications device receives the high-frequency narrow beam in a scanning sub-sector of the scanning sector corresponding to the second serial number, where the third scanning sector is any one of the H scanning sub-sectors, and the fourth scanning sector is any one of the P scanning sub-sectors. The receiver 34 receives a third serial number of the third scanning sector and a fourth serial number of the fourth scanning sector, where the third serial number and the fourth serial number correspond to a third maximum receiving statistic and are sent by the communications device, and the third maximum receiving statistic is a maximum value in H×P receiving statistics of received signals on H×P high-frequency narrow beams received by the communications device. The processor 35 performs high frequency beam alignment of a high frequency antenna with the communications device according to the third serial number and the fourth serial number.

Optionally, in another embodiment, the receiving statistic includes at least one of the following parameters power, an SNR, or an RSL.

Optionally, in another embodiment, the processor 35 may further perform mutual authentication with the communications device using the low frequency channel, or the transmitter 33 may send high-frequency frequency information to the communications device using the low frequency channel.

Optionally, in another embodiment, the transmitter 33 is further configured to send a scanning start time to the communications device using the low frequency channel. The receiver 34 is further configured to receive, using the low frequency channel, a scanning start time sent by the communications device. The processor 35 is configured to start, at the scanning start time in order to perform high frequency beam alignment of a high frequency antenna with the communications device according to the scanning range of the high frequency beam.

Figure 13:
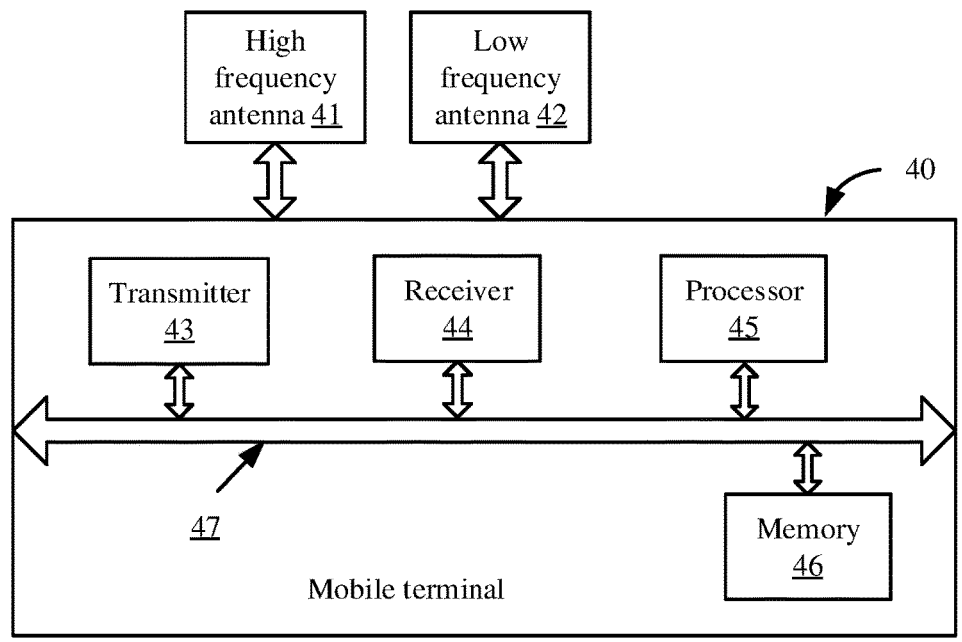
FIG. 13 is a block diagram of a mobile terminal for aligning antenna beams in a high-low frequency co-site network according to another embodiment of the present disclosure.

FIG. 13 is a block diagram of a mobile terminal for aligning antenna beams in a high-low frequency co-site network according to another embodiment of the present disclosure.

A mobile terminal 40 in FIG. 13 may be configured to implement steps and methods in the foregoing method embodiments. In the embodiment in FIG. 13, the mobile terminal 40 includes a high frequency antenna 41, a low frequency antenna 42, a transmitter 43, a receiver 44, a processor 45, and a memory 46. The processor 45 controls an operation of the mobile terminal 40, and may be configured to process a signal. The memory 46 may include a ROM and a RAM, and provide an instruction and data for the processor 45. The transmitter 43 and the receiver 44 may be coupled to the high frequency antenna 41 and the low frequency antenna 42. Components of the mobile terminal 40 are coupled together using a bus system 47. In addition to a data bus, the bus system 47 further includes a power bus, a control bus, and a status signal bus. However, for clarity of description, various buses are marked as the bus system 47 in FIG. 13. The processor 45 is configured to establish a low frequency channel with a low frequency antenna of a communications device, and perform high frequency beam alignment of a high frequency antenna with the communications device using the low frequency channel.

The methods disclosed in the foregoing embodiments of the present disclosure may be applied to the processor 45, or be implemented by the processor 45. In an implementation process, steps in the foregoing methods may be completed using an integrated logic circuit of hardware in the processor 45 or an instruction in a software form. The processor 45 may be a general-purpose processor, a digital signal processor, an application-specific integrated circuit, a field programmable gate array or another programmable logic device, a discrete gate or a transistor logic device, or a discrete hardware component, and may implement or execute methods, steps, and logic block diagrams that are disclosed in the embodiments of the present disclosure. The general purpose processor may be a microprocessor, any conventional processor, or the like. Steps of the methods disclosed with reference to the embodiments of the present disclosure may be directly executed and completely using a hardware processor, or may be executed and completely using a combination of hardware and software modules in the processor 45. The software module may be located in a mature storage medium in the art, such as a RAM, a flash memory, a ROM, a PROM, an electrically erasable programmable memory, or a register. The storage medium is located in the memory 46. The processor 45 reads information in the memory 46, and completes the steps of the foregoing methods with reference to the hardware of the processor 45.

Further, the processor 45 may be configured to establish a low frequency channel with a low frequency antenna of a communications device, and obtain location information of the communications device using the low frequency channel. The processor 45 is further configured to determine a scanning range of a high frequency beam according to the location information of the communications device, and perform high frequency beam alignment of a high frequency antenna with the communications device according to the scanning range of the high frequency beam.

In this embodiment of the present disclosure, when performing antenna beam alignment in a high-low frequency co-site network, a base station and a mobile terminal first establish a low frequency channel, and then perform high frequency beam alignment of a high frequency antenna using the low frequency channel. In this way, a technical problem that a high frequency beam alignment time is long due to a narrow field of view of a high frequency beam can be avoided such that high frequency beam alignment of a high frequency antenna can be quickly implemented.

The mobile terminal 40 can implement operations related to the mobile terminal in the foregoing method embodiments. To avoid repetition, details are not described herein again.

Optionally, in an embodiment, the receiver 44 is configured to receive, using the low frequency channel, the location information of the communications device that is determined using a GPS and is sent by the communications device.

Optionally, in another embodiment, the receiver 44 may receive, in the scanning range of the high frequency beam, M high-frequency narrow beams sent by the communications device, where each high-frequency narrow beam carries ID information used to indicate an ID of each high-frequency narrow beam. The processor 45 may determine M receiving statistics of the M high-frequency narrow beams. The transmitter 43 sends, to the communications device, a first ID that is of a first high-frequency narrow beam and corresponds to a first maximum receiving statistic, where the first maximum receiving statistic is a maximum value in the M receiving statistics corresponding to the received M high-frequency narrow beams, and the first high-frequency narrow beam is one of the M high-frequency narrow beams. The receiver 44 receives, using G high-frequency narrow beams, the first high-frequency narrow beam sent by the communications device. The processor 45 determines a second ID corresponding to a high-frequency narrow beam with a maximum receiving statistic in the G high-frequency narrow beams, and performs high frequency beam alignment of a high frequency antenna with the communications device according to the first ID and the second ID.

Optionally, in another embodiment, the mobile terminal 40 is an access device of the communications device. The transmitter 43 sends first scanning information to the communications device using the low frequency channel, or the receiver 44 receives, using the low frequency channel, first scanning information sent by the communications device, where the first scanning information is used to indicate a scanning sector division manner or a quantity of scanning sectors of the communications device and a scanning sector division manner or a quantity of scanning sectors of the access device. The processor 45 performs high frequency beam alignment of a high frequency antenna with the communications device according to the scanning range of the high frequency beam and the first scanning information.

Optionally, in another embodiment, the receiver 44 receives, in a second scanning sector, a high-frequency narrow beam sent by the communications device in a first scanning sector, where the first scanning sector is any one of Q scanning sectors, and the second scanning sector is any one of N scanning sectors. The processor 45 determines receiving statistics of received signals on Q×N high-frequency narrow beams that are in a one-to-one correspondence with the Q scanning sectors and the N scanning sectors, to obtain Q×N receiving statistics. The transmitter 43 sends a first serial number of the first scanning sector and a second serial number of the second scanning sector to the communications device, where the first serial number and the second serial number correspond to a second maximum receiving statistic, and the second maximum receiving statistic is a maximum value in the Q×N receiving statistics. The processor 45 performs high frequency beam alignment of a high frequency antenna with the communications device according to the first serial number and the second serial number, where the quantity of scanning sectors of the communications device is Q, the quantity of scanning sectors of the access device is N, Q is a positive integer, and N is a positive integer.

Optionally, in another embodiment, the transmitter 43 sends second scanning information to the communications device using the low frequency channel, or the receiver 44 receives, using the low frequency channel, second scanning information sent by the communications device, where the second scanning information is used to indicate a scanning sub-sector division manner or a quantity of scanning sub-sectors of a scanning sector corresponding to the first serial number and a scanning sub-sector division manner or a quantity of scanning sub-sectors of a scanning sector corresponding to the second serial number, the quantity of scanning sub-sectors of the scanning sector corresponding to the first serial number is H, the quantity of scanning sub-sectors of the scanning sector corresponding to the second serial number is P, H is a positive integer, and P is a positive integer. The processor 45 determines receiving statistics of received signals on H×P high-frequency narrow beams that are in a one-to-one correspondence with the H scanning sectors and the P scanning sectors, to obtain H×P receiving statistics. The transmitter 43 sends a third serial number of a third scanning sector and a fourth serial number of the fourth scanning sector to the communications device, where the third serial number and the fourth serial number correspond to a third maximum receiving statistic, and the third maximum receiving statistic is a maximum value in the H×P receiving statistics. The processor 45 performs high frequency beam alignment of a high frequency antenna with the communications device according to the third serial number and the fourth serial number.

Optionally, in another embodiment, the processor 45 may be further configured to perform mutual authentication with the communications device using the low frequency channel, or the transmitter 43 sends high-frequency frequency information to the communications device using the low frequency channel.

Optionally, in another embodiment, the transmitter 43 is further configured to send a scanning start time to the communications device using the low frequency channel, or the receiver 44 receives a scanning start time sent by the communications device. The processor 45 starts, at the scanning start time, to perform high frequency beam alignment of a high frequency antenna with the communications device according to the scanning range of the high frequency beam.

It should be understood that in this embodiment of the present disclosure, the low frequency channel may further be a wired channel such as an optical network. This is not limited in the present disclosure.

Description is provided only using antenna beam alignment between a base station and a mobile terminal as an example in the embodiments of the present disclosure. The present disclosure may be also applied to beam alignment between a base station and a base station antenna, or may be applied to beam alignment between a mobile terminal and a mobile terminal antenna.

It should be understood that "an embodiment" or "an embodiment" mentioned in the whole specification does not mean that particular features, structures, or characteristics related to the embodiment are included in at least one embodiment of the present disclosure. Therefore, "in an embodiment" appearing throughout the specification does not refer to a same embodiment. In addition, these particular features, structures, or characteristics may be combined in one or more embodiments using any appropriate manner.

It should be understood that sequence numbers of the foregoing processes do not mean execution sequences in various embodiments of the present disclosure. The execution sequences of the processes should be determined according to functions and internal logic of the processes, and should not be construed as any limitation on the implementation processes of the embodiments of the present disclosure.

It should be understood that in the embodiments of the present disclosure, "B corresponding to A" indicates that B is associated with A, and B may be determined according to A. However, it should further be understood that determining A according to B does not mean that B is determined according to A only, that is, B may also be determined according to A and/or other information.

The term "and/or" in this specification describes only an association relationship for describing associated objects and represents that three relationships may exist. For example, A and/or B may represent the following three cases, only A exists, both A and B exist, and only B exists. In addition, the character "/" in this specification generally indicates an "or" relationship between the associated objects.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

In the several embodiments provided in the present application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present disclosure may be integrated into one processing unit, or each of the units may exist alone physically, or two or more units are integrated into one unit.

The foregoing descriptions are merely specific implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A method for aligning an antenna beam, comprising:
   establishing a low frequency channel with a low frequency antenna of a communications device;
   obtaining location information of the communications device using the low frequency channel;
   transmitting, from one of a plurality of scanning sectors, a high-frequency narrow beam based on the location information for receipt by the communications device;
   receiving, in response to the high-frequency narrow beam, a first receiving statistic relating to the one of the plurality of scanning sectors and a second receiving statistic relating to one of a plurality of communication device scanning sectors for the communications device; and
   performing high frequency beam alignment of a high frequency antenna with the communications device when the first receiving statistic corresponds to the second receiving statistic, by
      either sending, through the low frequency channel, first scanning information to the communications device, or receiving first scanning information from the communications device, wherein the first scanning information indicates at least one of a scanning sector division manner or a quantity of scanning sectors of the communications device;
      performing high frequency beam alignment of a high frequency antenna based on the location information;
         receiving the high-frequency narrow beam from the one of the plurality of scanning sectors for receipt by one of the plurality of communication device scanning sectors;

determining receiving statistics of received signals on a Q×N matrix of high-frequency narrow beams that are in a one-to-one correspondence with Q scanning sectors and N scanning sectors, to obtain a Q×N matrix of receiving statistics, the Q being the plurality of scanning sectors of the communications device and the N being a plurality of scanning sectors for an access device;

sending a first serial number of a first scanning sector and a second serial number of a second scanning sector to the communications device, the first serial number and the second serial number corresponding to a second maximum receiving statistic, and the second maximum receiving statistic being a maximum value in the Q×N matrix of receiving statistics; and performing high frequency beam alignment of a high frequency antenna with the communications device according to the first serial number and the second serial number.

2. The method of claim 1, wherein obtaining location information of the communications device comprises:

receiving, through the low frequency channel, global positioning system (GPS) data relating to the communications device.

3. The method of claim 1, wherein performing high frequency beam alignment of the high frequency antenna with the communications device further comprises:

receiving M high-frequency narrow beams from the communications device, each of the M high-frequency narrow beams carries ID information, wherein M is a positive integer;

determining M receiving statistics of received signals on the M high-frequency narrow beams and corresponding to the M high-frequency narrow beams;

sending, to the communications device, the first receiving statistic including a first ID information of a first high-frequency narrow beam of the M high-frequency narrow beams and corresponds to a first maximum receiving statistic, the first maximum receiving statistic being a maximum value in the M receiving statistics;

receiving, using G high-frequency narrow beams, the first high-frequency narrow beam from the communications device, wherein G is a positive integer;

determining the second receiving statistic including a second ID information of one of the G high-frequency narrow beams, a received signal on the high-frequency narrow beam having a maximum receiving statistic; and performing high frequency beam alignment of a high frequency antenna with the communications device based on the first ID information and the second ID information.

4. The method of claim 1, wherein performing high frequency beam alignment of a high frequency antenna with the communications device according to the first serial number and the second serial number comprises:

either sending, using the low frequency channel, second scanning information to the communications device, or receiving second scanning information from the communications device, the second scanning information used to indicate a scanning sub-sector division manner or a quantity of scanning sub-sectors of a scanning sector corresponding to the first serial number and a scanning sub-sector division manner or a quantity of scanning sub-sectors of a scanning sector corresponding to the second serial number;

determining receiving statistics of received signals on a H×P matrix of high-frequency narrow beams that are in a one-to-one correspondence with H scanning sub-sectors and P scanning sub-sectors, to obtain a H×P matrix of receiving statistics, the H being a plurality of scanning sub-sectors corresponding to the first receiving statistic and the P being a plurality of scanning sub-sectors corresponding to the second receiving statistic, wherein H is a positive integer, and P is a positive integer;

sending a third serial number of a third scanning sector and a fourth serial number of the fourth scanning sector to the communications device, the third serial number and the fourth serial number corresponding to a third maximum receiving statistic, and the third maximum receiving statistic being a maximum value in the H×P matrix of receiving statistics; and performing high frequency beam alignment of a high frequency antenna with the communications device according to the third serial number and the fourth serial number.

5. The method of claim 1, wherein the first receiving statistic and the second receiving statistic comprise at least one of:

a power parameter;

a signal-to-noise ratio (SNR) parameter; or a received signal level (RSL) parameter.

6. The method of claim 1, wherein before performing high frequency beam alignment of the high frequency antenna with the communications device, the method further comprises at least one of:

performing, by the low frequency channel, mutual authentication with the communications device; or sending, by the low frequency channel, high-frequency frequency information to the communications device.

7. The method of claim 1, wherein performing high frequency beam alignment of a high frequency antenna with the communications device comprises:

either sending, using the low frequency channel, a scanning start time to the communications device, or receiving a scanning start time from the communications device; and starting, at the scanning start time, to perform high frequency beam alignment of a high frequency antenna with the communications device.

8. An apparatus for aligning an antenna in a high-low frequency co-site network, comprising:

a processor; and a memory coupled to the processor, wherein the memory comprises instructions that, when executed by the processor, cause the processor to be configured to:

establish a low frequency channel with a low frequency antenna of a communications device;

obtain location information of the communications device using the low frequency channel;

transmit, from one of a plurality of scanning sectors, a high-frequency narrow beam based on the location information for receipt by the communications device;

receive, in response to the high-frequency narrow beam, a first receiving statistic relating to the one of the plurality of scanning sectors and a second receiving statistic relating to one of a plurality of communication device scanning sectors for the communications device; and perform high frequency beam alignment of a high frequency antenna with the communications device when the first receiving statistic corresponds to the second receiving statistic;

either send, through the low frequency channel, first scanning information to the communications device, or receive first scanning information from the communications device, the first scanning information indicates at least one of a scanning sector division manner, a quantity of scanning sectors of the communications device;

perform high frequency beam alignment of a high frequency antenna based on the location information;

receive the high-frequency narrow beam from the one of the plurality of scanning sectors for receipt by one of the plurality of communication device scanning sectors;

determine receiving statistics of received signals on a Q×N matrix of high-frequency narrow beams that are in a one-to-one correspondence with Q scanning sectors and the N scanning sectors, to obtain a Q×N matrix of receiving statistics, the Q being the plurality of scanning sectors of the communications device and the N being a plurality of scanning sectors for an access device;

send a first serial number of the first scanning sector and a second serial number of the second scanning sector to the communications device, the first serial number and the second serial number corresponding to a second maximum receiving statistic, and the second maximum receiving statistic being a maximum value in the Q×N matrix of receiving statistics; and perform high frequency beam alignment of a high frequency antenna with the communications device according to the first receiving statistic and the second receiving statistic.

9. The apparatus of claim 8, wherein the instructions, when executed by the processor, further cause the processor to be configured to obtain the location information by receiving, using the low frequency channel, a global positioning system (GPS) data relating to the communications device.

10. The apparatus of claim 8, wherein the instructions, when executed by the processor, further cause the processor to be configured to:

receive M high-frequency narrow beams from the communications device, each of the M high-frequency narrow beams carries ID information, wherein M is a positive integer;

determine M receiving statistics that are of received signals on the M high-frequency narrow beams and corresponding to the M high-frequency narrow beams;

send, to the communications device, the first receiving statistic including a first ID information of a first high-frequency narrow beam of the M high-frequency narrow beams and corresponds to a first maximum receiving statistic, the first maximum receiving statistic being a maximum value in the M receiving statistics corresponding to the M high-frequency narrow beams;

receive, using G high-frequency narrow beams, the first high-frequency narrow beam from the communications device, wherein G is a positive integer;

determine the second receiving statistic including a second ID of a high-frequency narrow beam in the G high-frequency narrow beams, a received signal on the high-frequency narrow beam having a maximum receiving statistic; and perform high frequency beam alignment of a high frequency antenna with the communications device based on the first ID and the second ID.

11. The apparatus of claim 8, wherein the instructions, when executed by the processor, further cause the processor to be configured to:

either send, using the low frequency channel, second scanning information to the communications device, or receive second scanning information from by the communications device, the second scanning information used to indicate a scanning sub-sector division manner or a plurality of scanning sub-sectors of a scanning sector corresponding to the first serial number and a scanning sub-sector division manner or the plurality of scanning sub-sectors of a scanning sector corresponding to the second serial number;

determine receiving statistics of received signals on a H×P matrix of high-frequency narrow beams that are in a one-to-one correspondence with the H scanning sub-sectors and the P scanning sub-sectors, to obtain a H×P matrix of receiving statistics, the H being the plurality of scanning sub-sectors corresponding to the first serial number, and the P being a plurality of scanning sub-sectors corresponding to the second serial number, wherein H is a positive integer, and wherein P is a positive integer;

send a third serial number of a third scanning sector and a fourth serial number of the fourth scanning sector to the communications device, wherein the third serial number and the fourth serial number corresponding to a third maximum receiving statistic, and the third maximum receiving statistic being a maximum value in the H×P matrix of receiving statistics; and perform high frequency beam alignment of a high frequency antenna with the communications device according to the third serial number and the fourth serial number.

12. The apparatus of claim 8, wherein the first receiving statistic and the second receiving statistic comprise at least one of:

a power parameter;

a signal-to-noise ratio (SNR) parameter; or a received signal level (RSL) parameter.

13. The apparatus of claim 8, wherein the instructions, when executed by the processor, further cause the processor to be configured to perform alignment of the high frequency antenna by at least one of:

perform mutual authentication with the communications device using the low frequency channel; or send high-frequency frequency information to the communications device using the low frequency channel.

14. The apparatus of claim 8, wherein the instructions, when executed by the processor, further cause the processor to be configured to:

either send, using the low frequency channel, a scanning start time to the communications device, or receive a scanning start time from the communications device; and start, at the scanning start time to perform high frequency beam alignment of a high frequency antenna with the communications device.

15. A non-transitory computer readable storage medium comprising instructions that when executed by a processor cause the processor to be configured to:

establish a low frequency channel with a low frequency antenna of a communications device;
obtain location information of the communications device using the low frequency channel;
transmit, from one of a plurality of scanning sectors, a high-frequency narrow beam based on the location information for receipt by the communications device;
receive, in response to the high-frequency narrow beam, a first receiving statistic relating to the one of the plurality of scanning sectors and a second receiving statistic relating to one of a plurality of communication device scanning sectors for the communications device; and
perform high frequency beam alignment of a high frequency antenna with the communications device when the first receiving statistic corresponds to the second receiving statistic,
wherein the instructions, when executed by the processor, further cause the processor to be configured to:
either send, through the low frequency channel, first scanning information to the communications device, or receive first scanning information from the communications device, the first scanning information indicates at least one of a scanning sector division manner, a quantity of scanning sectors of the communications device; and
perform high frequency beam alignment of a high frequency antenna based on the location information, and
wherein the instructions, when executed by the processor, further cause the processor to be configured to:
receive the high-frequency narrow beam from the one of the plurality of scanning sectors for receipt by one of the plurality of communication device scanning sectors;
determine receiving statistics of received signals on a Q×N matrix of high-frequency narrow beams that are in a one-to-one correspondence with Q scanning sectors and the N scanning sectors, to obtain a Q×N matrix of receiving statistics, the Q being the plurality of scanning sectors of the communications device and the N being a plurality of scanning sectors for an access device;
send a first serial number of the first scanning sector and a second serial number of the second scanning sector to the communications device, the first serial number and the second serial number corresponding to a second maximum receiving statistic, and the second maximum receiving statistic being a maximum value in the Q×N matrix of receiving statistics; and
perform high frequency beam alignment of a high frequency antenna with the communications device according to the first receiving statistic and the second receiving statistic.

* * * * *